(12) United States Patent
Shioda et al.

(10) Patent No.: US 12,219,293 B2
(45) Date of Patent: Feb. 4, 2025

(54) IMAGE DATA COLLECTING APPARATUS, METHOD, AND PROGRAM

(71) Applicant: NIPPON TELEGRAPH AND TELEPHONE CORPORATION, Tokyo (JP)

(72) Inventors: Jun Shioda, Musashino (JP); Masaru Takagi, Musashino (JP); Kazuya Matsuo, Musashino (JP); Lidwina Ayu Andarini, Musashino (JP); Ryota Nakada, Musashino (JP); Koya Mori, Musashino (JP); Hiroyuki Tanaka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 272 days.

(21) Appl. No.: 17/633,335

(22) PCT Filed: Aug. 8, 2019

(86) PCT No.: PCT/JP2019/031514
§ 371 (c)(1),
(2) Date: Feb. 7, 2022

(87) PCT Pub. No.: WO2021/024490
PCT Pub. Date: Feb. 11, 2021

(65) Prior Publication Data
US 2022/0377283 A1  Nov. 24, 2022

(51) Int. Cl.
*H04N 7/18* (2006.01)
*G06T 7/20* (2017.01)
(Continued)

(52) U.S. Cl.
CPC .............. *H04N 7/181* (2013.01); *G06T 7/20* (2013.01); *G06T 7/70* (2017.01); *H04W 4/029* (2018.02); *G06T 2207/30261* (2013.01)

(58) Field of Classification Search
CPC . H04N 7/181; H04N 7/18; G06T 7/70; G06T 7/20; G06T 2207/30261; H04W 4/029
(Continued)

(56) References Cited

U.S. PATENT DOCUMENTS 11,432,697 B2 *   9/2022  Kwak ................... G05D 1/0289
2015/0220568 A1 *  8/2015  Ueda ....................... G06T 7/223
                                                      707/722

FOREIGN PATENT DOCUMENTS

JP         201975050 A      5/2019

OTHER PUBLICATIONS

KDDI, "Successful PoC demonstration of data flows control function by edge computing", https://www.kddi-research.jp/english/newsrelease/2018/022301.html, 2018.
(Continued)

*Primary Examiner* — Trang U Tran
(74) *Attorney, Agent, or Firm* — Harness, Dickey & Pierce, P.L.C.

(57) ABSTRACT

An image data collecting apparatus includes: an acquisition unit that acquires position information of a plurality of mobile bodies on which a photographing device is mounted, and a selecting unit that acquires, for each mobile body, the position information acquired for the plurality of mobile bodies, information indicating photographing ranges of the photographing devices mounted on the plurality of mobile bodies, and position information of a predetermined object, and selects a mobile body on which a photographing device that outputs collection target image data is mounted from the plurality of mobile bodies on the basis of the acquired
(Continued)

information; a transmitting unit that transmits a collection instruction for image data which is a photographing result of the photographing device mounted on the mobile body to the selected mobile body; and a receiving unit that receives the image data transmitted from the mobile body having received the collection instruction.

10 Claims, 30 Drawing Sheets

(51) Int. Cl.
    *G06T 7/70*     (2017.01)
    *H04W 4/029*     (2018.01)
(58) Field of Classification Search
    USPC .......................................................... 348/148
    See application file for complete search history.

(56) References Cited

OTHER PUBLICATIONS

T. Vincenty, "Direct and Inverse Solutions of Geodesics on the Ellipsoid with application of nested equations", Survey Review, vol. 23, No. 176, pp. 88-93, 1975.
Toyota Central R&D Labs., "Measurement of position of preceding vehicle using video images", https://www.tytlabs.com/japanese/review/rev323pdf/323_0111tange.pdf, 2015.
Haku Ri, Zhang Xiaolin, Makoto Sato, "Inter-vehicle distance Pitch angle estimation using an in-vehicle monocular camera for distance measurement", https://www.jstage.jst.go.jp/article/itej/69/4/69_J169/_article/-char/ja/, 2015.
International Search Report (English and Japanese) issued in PCT/JP2019/031514, mailed on Aug. 8, 2019.

* cited by examiner

Fig. 7A

| BEHAVIOR PATTERN | | | | THOSE THAT ACQUIRE AND PROVIDE POSITION INFORMATION THEMSELVES |
|---|---|---|---|---|
| | STOP/PARKING | | MOVE | |
| STOP FOR A CERTAIN PERIOD OF TIME AND THEN MOVING | STOP AND PARKING TIME | SEVERAL SECONDS OR LESS | ALONG LANE | LOW-SPEED SALES CARS WHICH ARE CONNECTED CARS, MOTORCYCLES AND BICYCLES (GPS ON), AND TRAMS |
| | | | NOT ALONG LANE | PEDESTRIAN (GPS ON) |
| | | SEVERAL MINUTES | ALONG LANE | ROAD STANDING-GENERAL VEHICLES, BUSES, GARBAGE COLLECTION VEHICLE, POSTAL VEHICLES, AND HOME DELIVERY VEHICLES (POWER ON) WHICH ARE CONNECTED CARS, ROAD STANDING MOTORCYCLE AND BICYCLE (GPS ON), TRAM |
| | | | NOT ALONG LANE | PEDESTRIAN (GPS ON) |
| | | SEVERAL TENS OF MINUTES | ALONG LANE | ROAD-PARKED-GENERAL VEHICLES WHICH ARE CONNECTED CARS, LOW-SPEED SALES VEHICLES (POWER ON), ROAD-PARKED MOTORCYCLES AND BICYCLES (GPS ON) |
| | | | NOT ALONG LANE | - |
| | | SEVERAL HOURS | ALONG LANE | ROAD-PARKED-GENERAL VEHICLES WHICH ARE CONNECTED CARS, MOVING TRUCKS (POWER ON), ROAD-PARKED MOTORCYCLES AND BICYCLES (GPS ON) |
| | | | NOT ALONG LANE | - |
| | | SEVERAL DAYS OR MORE | ALONG LANE | ROAD-PARKED-GENERAL VEHICLES (POWER ON) WHICH ARE CONNECTED CARS, ROAD-PARKED MOTORCYCLES AND BICYCLES (GPS ON) |
| | | | NOT ALONG LANE | - |

Fig. 7B

| BEHAVIOR PATTERN | | | | THOSE THAT CAN ACQUIRE BUT DO NOT PROVIDE POSITION INFORMATION THEMSELVES |
|---|---|---|---|---|
| STOP FOR A CERTAIN PERIOD OF TIME AND THEN MOVING | STOP/PARKING | | MOVE | |
| | STOP AND PARKING TIME | SEVERAL SECONDS OR LESS | ALONG LANE | LOW-SPEED SALES CARS WHICH ARE NOT CONNECTED CARS, MOTORCYCLES AND BICYCLES (GPS ON), AND TRAMS |
| | | | NOT ALONG LANE | PEDESTRIAN (GPS ON) |
| | | SEVERAL MINUTES | ALONG LANE | ROAD STANDING-GENERAL VEHICLES, BUSES, GARBAGE COLLECTION VEHICLE, POSTAL VEHICLES, AND HOME DELIVERY VEHICLES (POWER ON) WHICH ARE NOT CONNECTED CARS, ROAD STANDING MOTORCYCLE / BICYCLE (GPS ON), TRAM |
| | | | NOT ALONG LANE | PEDESTRIAN (GPS ON) |
| | | SEVERAL TENS OF MINUTES | ALONG LANE | ROAD-PARKED-GENERAL VEHICLES WHICH ARE NOT CONNECTED CARS, LOW-SPEED SALES VEHICLES (POWER ON), ROAD-PARKED MOTORCYCLES AND BICYCLES (GPS ON) |
| | | | NOT ALONG LANE | - |
| | | SEVERAL HOURS | ALONG LANE | ROAD-PARKED-GENERAL VEHICLES WHICH ARE NOT CONNECTED CARS, MOVING TRUCKS (POWER ON), ROAD-PARKED MOTORCYCLES AND BICYCLES (GPS ON) |
| | | | NOT ALONG LANE | - |
| | | SEVERAL DAYS OR MORE | ALONG LANE | ROAD-PARKED-GENERAL VEHICLES (POWER ON) WHICH ARE NOT CONNECTED CARS, ROAD-PARKED MOTORCYCLES AND BICYCLES (GPS ON) |
| | | | NOT ALONG LANE | - |

Fig. 7C

| BEHAVIOR PATTERN | | | | THOSE THAT CANNOT ACQUIRE AND PROVIDE POSITION INFORMATION THEMSELVES |
|---|---|---|---|---|
| STOP FOR A CERTAIN PERIOD OF TIME AND THEN MOVING | STOP AND PARKING TIME | STOP/PARKING | MOVE | |
| | | SEVERAL SECONDS OR LESS | ALONG LANE | MOTORCYCLES, BICYCLES, AND PEDESTRIANS (GPS OFF) |
| | | | NOT ALONG LANE | PEDESTRIANS (GPS OFF), ANIMALS, GARBAGE (THINGS THAT MOVE SUCH AS COLDS WITHOUT HUMAN INTERVENTION) |
| | | SEVERAL MINUTES | ALONG LANE | ROAD STANDING DELIVERY VEHICLES (POWER OFF), ROAD STANDING MOTORCYCLES AND BICYCLES (GPS OFF) |
| | | | NOT ALONG LANE | GARBAGE (CARDBOARD, AND THE LIKE THAT FLIES IN THE WIND) |
| | | SEVERAL TENS OF MINUTES | ALONG LANE | ROAD-PARKED-GENERAL VEHICLES, LOW-SPEED SALES VEHICLES (POWER OFF), ROAD-PARKED MOTORCYCLES AND BICYCLES (GPS OFF) |
| | | | NOT ALONG LANE | ACCIDENT VEHICLES, ROAD CONSTRUCTION, GARBAGE (MOVING WITHOUT HUMAN INTERVENTION, OR THINGS THAT CANNOT BE MOVED WITHOUT HUMAN INTERVENTION, SUCH AS PART OF VEHICLE BODY) |
| | | SEVERAL HOURS | ALONG LANE | ROAD-PARKED-GENERAL VEHICLES, MOVING TRUCKS (POWER OFF), ROAD-PARKED MOTORCYCLES AND BICYCLES (GPS OFF) |
| | | | NOT ALONG LANE | ACCIDENT VEHICLES, ROAD CONSTRUCTION, FALLEN TREES, GARBAGE (THINGS THAT DO NOT MOVE WITHOUT HUMAN INTERVENTION) |
| | | SEVERAL DAYS OR MORE | ALONG LANE | ROAD-PARKED-GENERAL VEHICLES (POWER OFF), ROAD-PARKED MOTORCYCLES AND BICYCLES (GPS OFF) |
| | | | NOT ALONG LANE | COLLAPSED ROAD SURFACE DUE TO DISASTER, ROAD CONSTRUCTION |

IMAGE DATA COLLECTING APPARATUS, METHOD, AND PROGRAM

CROSS-REFERENCE TO RELATED APPLICATIONS

This application is a 371 U.S. National Phase of International Application No. PCT/JP2019/031514 filed on Aug. 8, 2019. The entire disclosures of the above applications are incorporated herein by reference.

FIELD

Embodiments of the present invention relate to an image data collecting apparatus, a method, and a program.

BACKGROUND OF THE INVENTION

In recent years, connected cars, which transmit automobile travel data in real time to a cloud environment on the Internet, have been attracting attention. As connected cars become more widespread, it will be possible to collect information such as the state of vehicles and the surrounding conditions of vehicles on a server from many vehicles via a network. In particular, image data (sometimes referred to simply as an image) photographed by an on-board camera has a wide range of applications, and is expected to be applied to various application programs (hereinafter, applications). Applications include, for example, generation of dynamic maps or static maps, road surface diagnosis, and detection, notification, or monitoring of obstacles.

A system that manages the distance, position information, traveling direction, and speed between vehicles on an edge server using a fact that the travel data is likely to be duplicated or similar among a plurality of vehicles traveling in a string of beads, groups the plurality of vehicles traveling in a string of beads using the managed information, and collects data only from representative vehicles in this group is known (for example, see NPL 1).

CITATION LIST

Non Patent Literature 1

KDDI, "Successful PoC demonstration of data flows control function by edge computing", https://www.kddi-research.jp/english/newsrelease/2018/022301.html, 2018

SUMMARY

Technical Problem

However, depending on the type of application, there are cases where it is necessary to collect a large amount of image data from a large number of vehicles at a high frequency, and the amount of communication traffic becomes enormous. At this time, a delay related to the communication of image data occurs.

In such a case, when the existing communication equipment is used, congestion related to communication occurs, and the degree of delay related to communication is high. As a result, the operating speed of the application slows down.

In particular, since the communication speed in a wireless section (mobile network) is lower than that in a wired section, it is important to reduce the amount of communication traffic.

The present invention has been made in view of the above-mentioned circumstances, and one aspect of the present invention is to provide a technique for reducing the delay related to communication of image data and making it possible to smoothly operate an application that handles the image.

Solution to Problem

An image data collecting apparatus according to one aspect of the present invention includes an acquisition unit that acquires position information of a plurality of mobile bodies on which a photographing device is mounted, and a selecting unit that acquires, for each mobile body, the position information acquired for the plurality of mobile bodies, information indicating photographing ranges of the photographing devices mounted on the plurality of mobile bodies, and position information of a predetermined object, and selects a mobile body on which a photographing device that outputs collection target image data is mounted from the plurality of mobile bodies on the basis of the acquired information; a transmitting unit that transmits a collection instruction for image data which is a photographing result of the photographing device mounted on the mobile body to the selected mobile body; and a receiving unit that receives the image data transmitted from the mobile body having received the collection instruction.

An image data collection method according to one aspect of the present invention is an image data collection method executed by an image data collecting apparatus, including: acquiring position information of a plurality of mobile bodies on which a photographing device is mounted, and acquiring, for each mobile body, the position information acquired for the plurality of mobile bodies, information indicating photographing ranges of the photographing devices mounted on the plurality of mobile bodies, and position information of a predetermined object, and selecting a mobile body on which a photographing device that outputs collection target image data is mounted from the plurality of mobile bodies on the basis of the acquired information; transmitting a collection instruction for image data which is a photographing result of the photographing device mounted on the mobile body to the selected mobile body; and receiving the image data transmitted from the mobile body having received the collection instruction.

Advantageous Effects of Invention

According to the present invention, it is possible to reduce the delay related to the communication of image data and smoothly operate the application that handles the image.

BRIEF DESCRIPTION OF THE DRAWINGS

FIG. 7A is a diagram illustrating an example of definition and classification of obstacles in a table format.

FIG. 7B is a diagram illustrating an example of definition and classification of obstacles in a table format.

FIG. 7C is a diagram illustrating an example of definition and classification of obstacles in a table format.

DETAILED DESCRIPTION

Hereinafter, an embodiment according to the present invention will be described with reference to the drawings.

First Embodiment (Configuration)
(1) System

Figure 1:
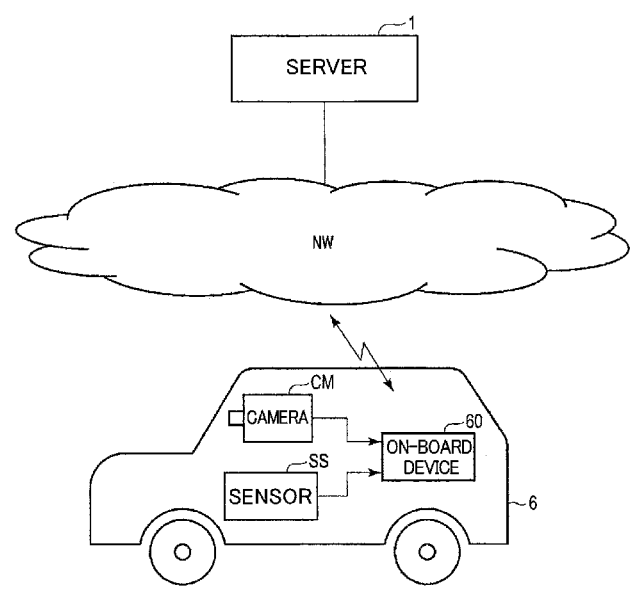
FIG. 1 is a diagram illustrating an example of an overall configuration of an image data collection system according to a first embodiment of the present invention.

FIG. 1 is a diagram illustrating an example of the overall configuration of an image data collection system according to a first embodiment of the present invention.

This system is a system capable of communicating between a server 1 and an on-board device 60 having a communication function mounted on a mobile body 6 via the Internet, which is a communication network NW. The server 1 is, for example, a cloud server provided on the Web or on the cloud. Here, the server 1 functions as an image data collecting apparatus. Note that FIG. 1 illustrates an example in which the server 1 can communicate with one mobile body 6 for the sake of simplicity, but the server 1 can communicate with a plurality of mobile bodies 6. Further, although FIG. 1 illustrates an example in which the number of servers 1 is one for the sake of simplicity, the number may be plural.

Further, the server 1 may be an edge server capable of communicating with the mobile body 6 via an access network. Edge servers are installed in small-scale data centers, base stations, and the like. Further, the server 1 may be a combination of a cloud server and an edge server.

The network NW is composed of, for example, a relay network and a plurality of access networks for accessing the relay network. As the relay network, a public network such as the general Internet or a closed network controlled so that it can be accessed only from a limited number of devices is used. As the access network, for example, a wireless LAN (Local Area Network), a mobile phone network, a wired telephone network, or the like is used.

In FIG. 1, an automobile is illustrated as an example of the mobile body 6. Further, a camera CM and a sensor SS are attached to the on-board device 60 mounted on the mobile body 6. FIG. 1 illustrates an example in which the number of camera CMs attached to the on-board device 60 and the number of sensor SSs are one each, but the number may be plural. The camera CM and the sensor SS may be devices built in the on-board device 60. Further, the camera CM and the sensor SS may be collectively referred to as a sensing device.

As the camera CM, for example, a solid-state imaging device such as a CCD (Charge Coupled Device) or CMOS (Complementary Metal Oxide Semiconductor) sensor is used, and the installation location, orientation and angle of the camera CM are set such that a road region in an arbitrary direction such as the traveling direction of the mobile body 6 is included in the photographing range. The camera CM acquires camera image data and outputs the acquired data to the on-board device 60. The camera image data includes camera identification information (camera ID (identification information)) and information indicating the photographing date and time.

The camera CM may be provided exclusively for the image data collection process. However, any camera that can obtain equivalent data, such as a drive recorder camera or an on-board camera mounted for other purposes, can be used as a camera CM. For example, when the mobile body 6 is a two-wheeled vehicle or a bicycle, a camera provided on a helmet worn by the driver may be used as the camera CM. Further, a camera provided in a mobile terminal such as a smartphone or a tablet terminal possessed by a passenger of the mobile body 6 may be used as a camera CM. Further, the camera CM may be an infrared camera. Further, the data acquired by the camera CM may be moving image (video) data or still image data photographed at regular time intervals.

The sensor SS may include (1) a distance and direction sensor such as LiDAR (Light Detecting And Ranging), (2) a position sensor (hereinafter sometimes referred to as GPS sensor) that calculates the position information (latitude and longitude) of the host vehicle using GPS (Global Positioning System), (3) a radar, and (4) a speed sensor. The sensor SS may be provided exclusively for an image data collection process, or may be a sensor such as CAN (Controller Area Network) usually provided for controlling the operation of the mobile body 6 or collecting log data. Further, the sensor SS may be a mobile terminal such as a smartphone.

The position sensor calculates the latitude and longitude of the mobile body 6 by receiving GPS signals transmitted from a plurality of GPS satellites and performing ranging calculation, and outputs the GPS data including the calculated latitude and longitude to the on-board device 60. In addition to the position information, the GPS data may also include information indicating the certainty of the position measurement using GPS. The certainty of position measurement using GPS is determined, for example, according to the arrangement state of GPS satellites. The acquisition of position information is not limited to the method using signals from GPS satellites, and if an equivalent function is exhibited, another method such as using the position information of a wireless base station or a WiFi access point may be used.

The speed sensor is, for example, a wheel speed sensor, which is installed in a rotating portion such as a drive shaft to measure the speed of the mobile body 6 on the basis of the rotating speed of the rotating portion. The speed sensor outputs the measured speed data to the on-board device 60.

The on-board device 60 is, for example, a wireless device mounted on the dashboard of an automobile. The on-board device 60 can receive various types of data from the camera CM and the sensor SS, and transmit the received data to the server 1 via the network NW together with date and time information and identification information of the on-board device 60 (or an ETC (Electronic Toll Collection system) card inserted therein). The on-board device 60 is not an indispensable configuration, and the camera CM and the sensor SS may be configured to directly transmit data to the server 1. Further, the camera CM and the sensor SS do not have to be separate devices, and these may be incorporated into one device and may be integrated into the on-board device.

The server 1 is, for example, a server device provided in an image data collection center, and performs a process of collecting images in a target area.

The server 1 receives the mobile body data (hereinafter referred to as "travel data") collected by the mobile body 6 via the network NW. The mobile body data includes camera image data (image data), GPS data, and speed data. On the basis of the received data, the server 1 collects the image data photographed by the mobile body 6 periodically or in response to a request from an operator or the like, for example.

The server 1 can output the collected image data to an external device. For example, the server 1 can transmit the collected image data to the on-board device 60 mounted on the mobile body 6 in order to notify the driver of the mobile body 6, and display the collected image data on the display unit of the on-board device 60. Alternatively, the server 1 can transmit the collected image data to a road information display device (not illustrated) or the like under the control of the image data collection center and display the same.

The server 1 may directly receive the travel data transmitted from the on-board device 60 periodically or at an arbitrary timing, for example, or may obtain necessary data from the on-board device 60 by accessing the on-board device 60.

Alternatively, the server 1 may acquire travel data by accessing the data once transmitted from the on-board device 60 to a database server (not illustrated) or the like and stored in the database server at an arbitrary timing, or may acquire the travel data stored in an external medium via an input device 2 described later.

The automobile exemplified as the mobile body 6 is not limited to a specific automobile, and may be an automobile related to various individuals, vehicle types, and manufacturers. In the following, as an example, the mobile body 6 will be described as a vehicle, but the mobile body 6 may be any mobile body that can be charged for the use of roads such as automobiles, motorcycles, bicycles, personal mobilities, and vehicles towed by livestock such as horse-drawn carriages. Moreover, the mobile body 6 is not limited to a vehicle and may be a pedestrian. Therefore, the on-board device illustrated in FIG. 1 is only an example, and may be replaced with an information processing terminal such as a smartphone.

Figure 2:
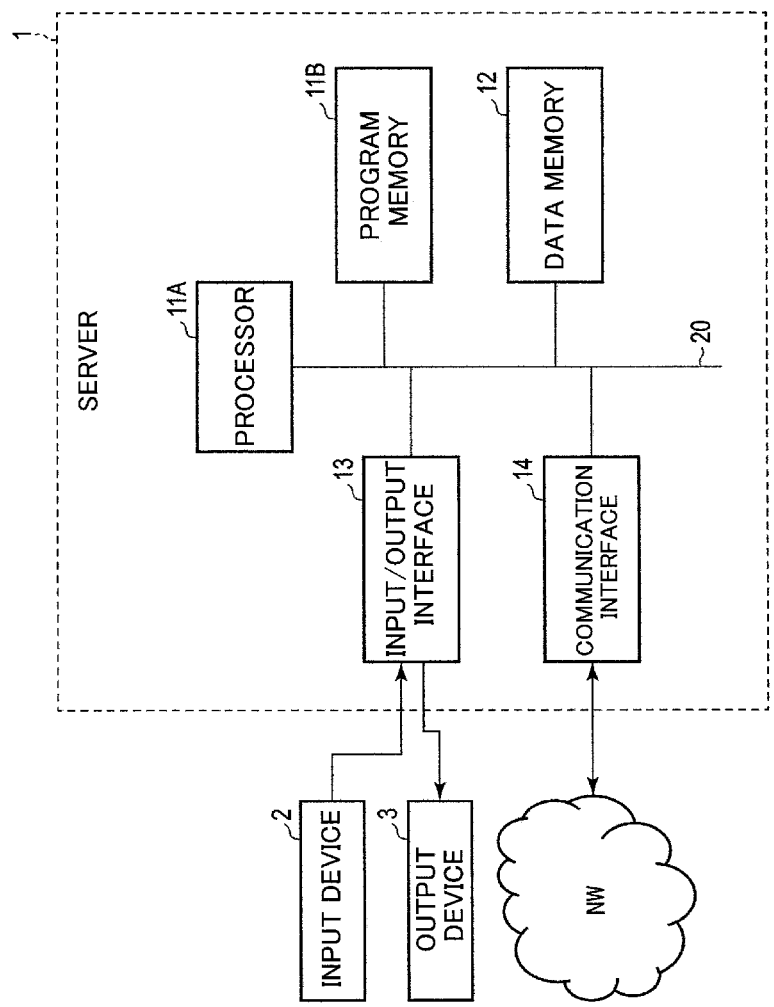
FIG. 2 is a block diagram illustrating an example of a hardware configuration of a server of the image data collection system according to the first embodiment of the present invention.

(2) Server
(2-1) Hardware Configuration
FIG. 2 is a block diagram illustrating an example of the hardware configuration of the server 1 of the image data collection system according to the first embodiment of the present invention.

The server 1 is configured as, for example, a server computer or a personal computer, and has a hardware processor 11A such as a CPU (Central Processing Unit). In the server 1, a program memory 11B, a data memory 12, an input/output interface 13, and a communication interface 14 are connected to the hardware processor 11A via a bus 20.

The communication interface 14 includes, for example, one or more wired or wireless communication interfaces, and enables information to be transmitted and received to and from an external device including the on-board device 60 mounted on the mobile body 6. As the wired interface, for example, a wired LAN is used. Further, as the wireless interface, for example, a wireless LAN or an interface adopting a low-power wireless data communication standard such as Bluetooth (registered trademark) is used.

An input device 2 and an output device 3 attached to the server 1 are connected to the input/output interface 13. The input device 2 is a keyboard, a touch panel, a touch pad, a mouse, or the like. The output device 3 may include a display device using liquid crystal, organic EL (Electro Luminescence), or the like, and a speaker that outputs sound. The input/output interface 13 performs a process of taking in the operation data input by an operator via the input device 2 and a process of outputting the output data to the output device 3 and displaying the data. The input device 2 and the output device 3 may be devices built in the server 1, or may be an input device and an output device of other information terminals capable of communicating via the network NW.

The program memory 11B is a non-transitory tangible computer-readable storage medium, and for example, a combination of a non-volatile memory such as an HDD (Hard Disk Drive) or an SSD (Solid State Drive) that can be written and read at any time, and a non-volatile memory such as a ROM (Read Only) is used. The program memory 11B stores programs necessary for executing various control processes according to the embodiment.

The data memory 12 is a tangible computer-readable storage medium, and for example, a combination of a non-volatile memory such as an HDD or SSD that can be written and read at any time and a volatile memory such as a RAM (Random Access Memory) is used. The data memory 12 is used for storing various types of data acquired and created in the process of performing the data collection process.

(2-2) Software Configuration

Figure 3:
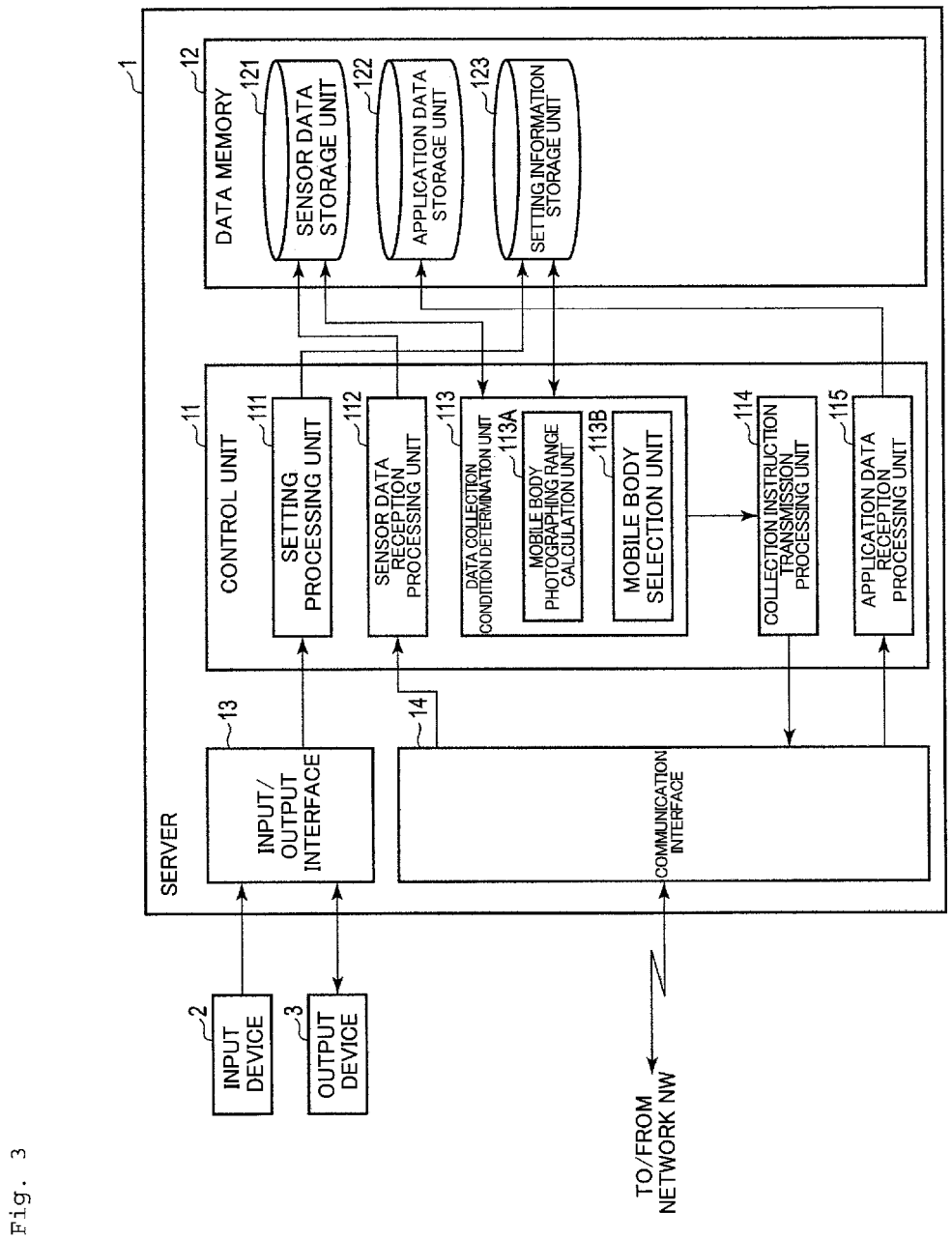
FIG. 3 is a block diagram illustrating an example of a software configuration of a server of the image data collection system according to the first embodiment of the present invention.

FIG. 3 is a block diagram illustrating an example of the software configuration of the server 1 of the image data collection system according to the first embodiment of the present invention.

The server 1 can be configured as a data processing device including the control unit 11, the data memory 12, the input/output interface 13, and the communication interface 14.

The communication interface 14 transmits and receives data to and from the on-board device 60 via the network NW under the control of the control unit 11. As the communication protocol, the protocol specified by the network NW is used.

The storage area of the data memory 12 is provided with a sensor data storage unit 121, an application data storage unit 122, and a setting information storage unit 123.

However, the storage units 121 to 123 are not indispensable, and are provided in, for example, an externally-attached storage medium such as a USB (Universal Serial Bus) memory or a storage device such as a database server arranged in the cloud.

The sensor data storage unit 121 is used for storing the sensor data collected from the sensor SS in the on-board device 60. The sensor data includes an ID, position information, traveling speed, traveling direction, time information, and the like of the mobile body 6 on which the on-board device 60 that collects the sensor data is mounted. The sensor data may include the type, model name, number, specifications, and the like of the sensors SS mounted on the mobile body 6, which is associated with the ID of the mobile body 6.

The application data storage unit 122 is used for storing application data including video data collected from the on-board device 60. The application data includes the ID, position information, traveling speed, traveling direction, and time information of the mobile body 6 on which the on-board device 60 of an image data collection source is mounted, and the type, the model name, the number, and the specification information of cameras CM. This specification information includes (1) the angle of view of the camera CM, (2) the maximum distance at which the object to be photographed can be photographed (hereinafter, the photographable distance), (3) the resolution, and (4) the frame rate.

The setting information storage unit 123 is used for storing setting information related to image data collection.

The control unit 11 is composed of the hardware processor 11A and the program memory 11B, and includes a setting processing unit 111, a sensor data reception processing unit 112, a data collection condition determination unit 113, a collection instruction transmission processing unit 114, and an application data reception processing unit 115 as software-based processing functional units.

Each of these processing functional units is realized by causing the hardware processor 11A to execute a program stored in the program memory 11B. The control unit 11 may also be implemented in a variety of other forms, including integrated circuits such as ASICs (Application Specific Integrated Circuits) and FPGAs (Field-Programmable Gate Arrays). It should be noted that these processing functions may not be realized using the program stored in the program memory 11B, but may be realized using a program provided through a communication network.

The setting processing unit 111 performs a process of receiving information (algorithms, thresholds, or the like) representing the conditions of an image data collection process, input by the operation by a system administrator, for example, from a management terminal used by the system administrator via the input/output interface 13 or the communication interface 14 and storing the same in the setting information storage unit 123.

The sensor data reception processing unit 112 performs a process of receiving the sensor data transmitted from the sensor SS in the on-board device 60 via the communication interface 14, and stores the sensor data in the sensor data storage unit 121.

The data collection condition determination unit 113 includes a mobile body photographing range calculation unit 113A and a mobile body selection unit 113B. The mobile body photographing range calculation unit 113A determines the photographing range of the camera CM mounted on the mobile body 6 on which the sensor SS, which is the collection source of the sensor data stored in the sensor data storage unit 121, is mounted.

This photographing range is calculated on the basis of (1) the position information of the mobile body 6 on which the sensor SS, which is the collection source of the sensor data, is mounted, (2) the angle of view of the mounted camera CM, and (3) the photographable distance related to the object to be photographed. In this way, the photographing range is determined.

The mobile body selection unit 113B selects the mobile body 6 on which the camera CM is mounted, which is an appropriate image data collection destination, using the photographable distance calculated by the mobile body photographing range calculation unit 113A, and outputs the content of the image data collection instruction related to the mobile body 6. The image data collection instruction content includes an ID (identification information) unique to the selected mobile body 6, the type and format of the sensor data collected from the mobile body 6, the photographing time of the camera image data to be collected, and the like. The appropriate image data collection destination differs depending on the type of application in which the collected image data is used.

The collection instruction transmission processing unit 114 performs a process of transmitting a collection instruction for the image data photographed by the camera CM attached to the on-board device 60 in the mobile body 6 selected by the mobile body selection unit 113B to the on-board device 60 via the communication interface 14.

The application data reception processing unit 115 performs a process of receiving the image data photographed and transmitted by the camera CM attached to the on-board device 60, which is the collection instruction destination of the collection instruction transmission processing unit 114, via the communication interface 14 in association with the identification information of the on-board device 60, the photographing time, and the like. The application data reception processing unit 115 performs a process of storing the received data as application data in the application data storage unit 122.

(3) On-Board Device (3-1) Hardware Configuration

Figure 4:
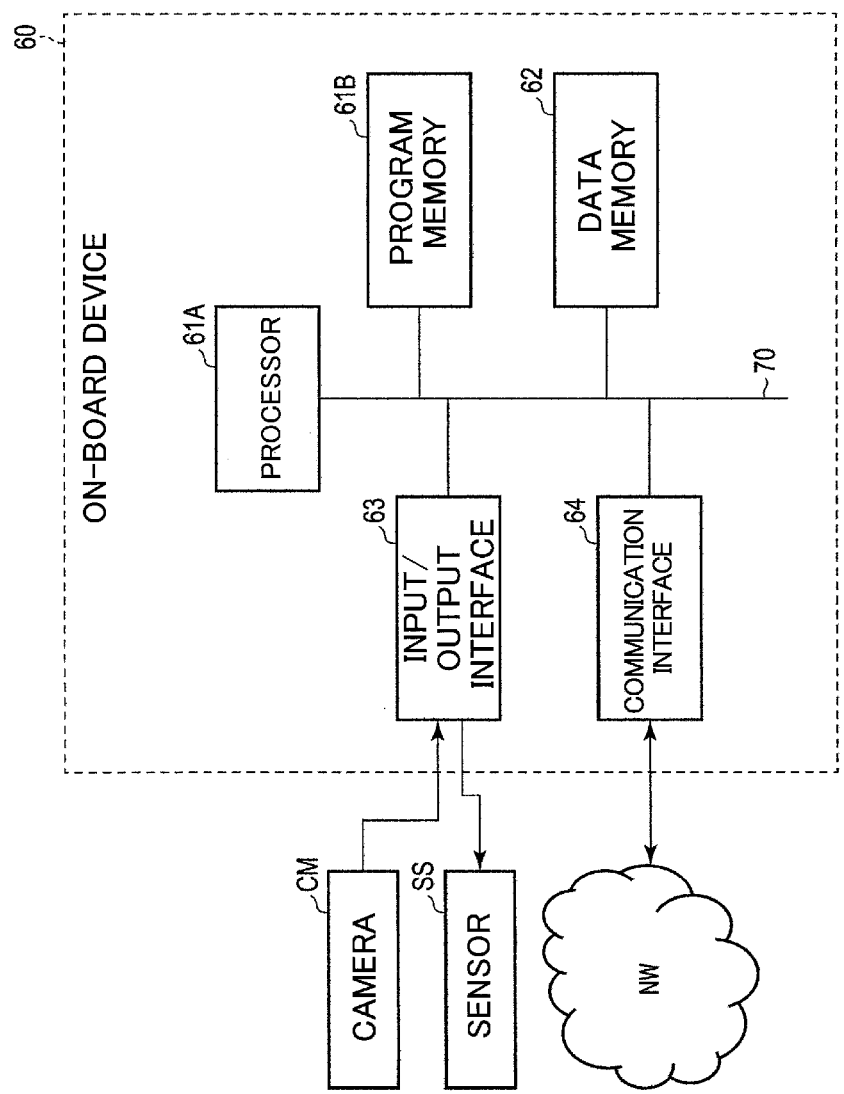
FIG. 4 is a block diagram illustrating an example of a hardware configuration of an on-board device of the image data collection system according to the first embodiment of the present invention.

FIG. 4 is a block diagram illustrating an example of the hardware configuration of the on-board device 60 of the image data collection system according to the first embodiment of the present invention.

The on-board device 60 is configured as, for example, a small computer, and has a hardware processor 61A such as a CPU. In the on-board device 60, the program memory 61B, a data memory 62, an input/output interface 63, and a communication interface 64 are connected to the hardware processor 61A via a bus 70.

The communication interface 64 includes, for example, one or more wired or wireless communication interfaces, and enables information to be transmitted and received to and from (1) the server 1 and (2) an external device including another on-board device 60 mounted on another mobile body 6.

The camera CM and the sensor SS attached to the on-board device 60 are connected to the input/output interface 63.

The program memory 61B is a non-transitory tangible computer-readable storage medium, and for example, a non-volatile memory such as an HDD or SSD that can be written and read at any time and a non-volatile memory such as a ROM are used in combination. The program memory 61B stores programs necessary for executing various control processes according to the embodiment.

The data memory 62 is a tangible computer-readable storage medium, and for example, a non-volatile memory such as an HDD or SSD that can be written and read at any time and a volatile memory such as a RAM are used in combination. The data memory 62 is used for storing various types of data acquired and created in the process of performing the data collection process.

(3-2) Software configuration

Figure 5:
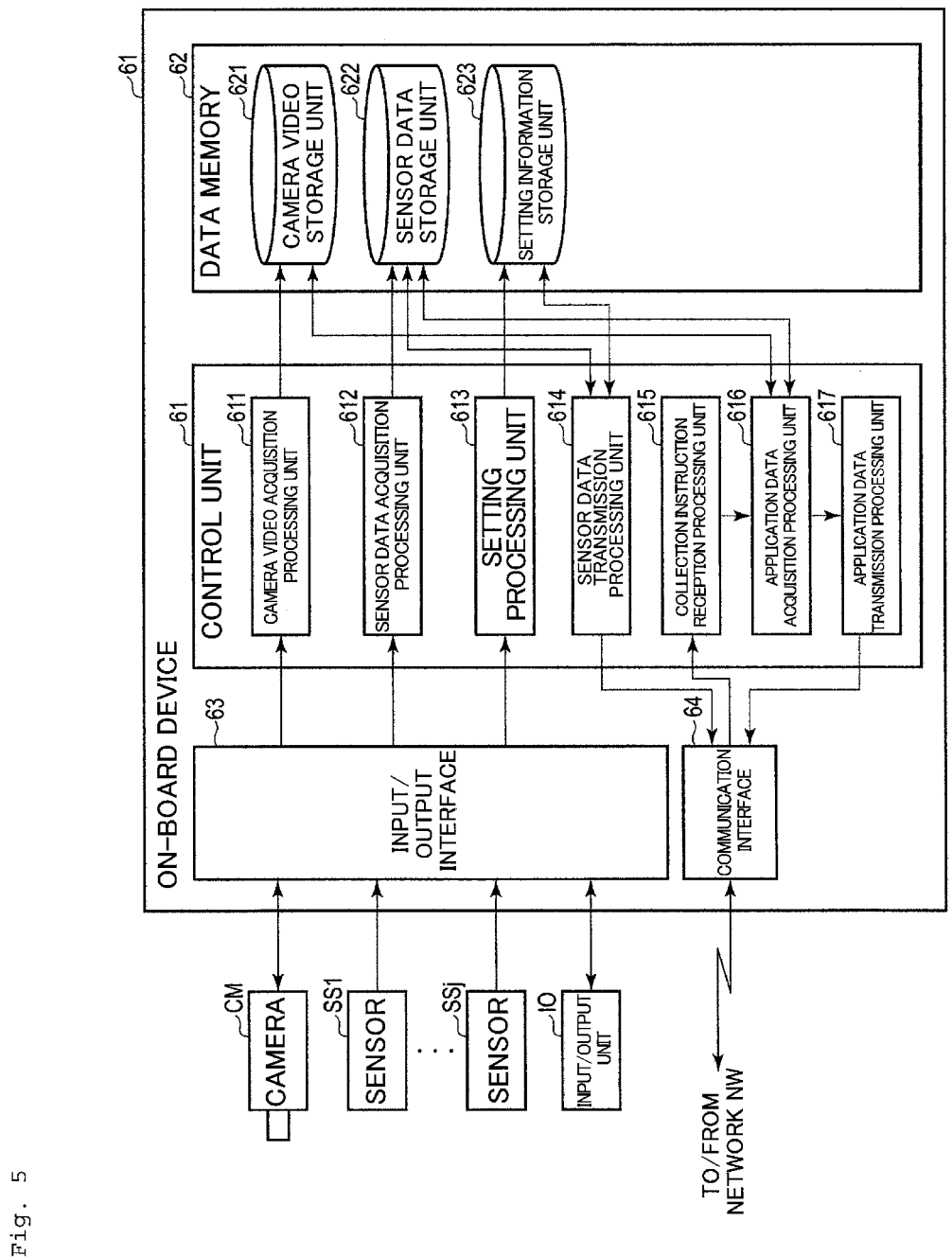
FIG. 5 is a block diagram illustrating an example of a software configuration of the on-board device of the image data collection system according to the first embodiment of the present invention.

FIG. 5 is a block diagram illustrating a software configuration of the on-board device 60 of the image data collection system according to the first embodiment of the present invention.

The on-board device 60 is configured as a small computer or the like mounted on the mobile body 6, and includes the control unit 61, the data memory 62, the input/output interface 63, and the communication interface 64.

The input/output interface 63 has a function of receiving video data output from the camera CM and sensor data output from sensors SS1 to SSj, which are j sensors.

Under the control of the control unit 61, the communication interface 64 transmits and receives data to and from (1) the server 1 and (2) an external device including another on-board device 60 mounted on another mobile body 6 via the network NW.

A camera video storage unit 621, a sensor data storage unit 622, and a setting information storage unit 623 are provided in the storage area of the data memory 62.

The camera video storage unit 621 is used for storing the video data collected from the camera CM. The sensor data storage unit 622 is used for storing the sensor data collected from the sensors SS1 to SSj at the time of photographing the video data. The camera video storage unit 621 or the sensor data storage unit 622 stores related information indicating the relationship between the video data and the sensor data collected from the sensors SS1 to SSj at the time of photographing the image data. In the following, it is assumed that this related information is stored in the sensor data storage unit 622. The setting information storage unit 623 is used for storing information indicating the conditions of the image data collection process described later.

However, the storage units 621 to 623 are not indispensable configurations, and may be provided in, for example, an external storage medium such as a USB memory or a storage device such as a database server arranged in the cloud.

The control unit 61 is composed of the hardware processor 61A and the program memory 61B, and includes a camera video acquisition processing unit 611, a sensor data acquisition processing unit 612, a setting processing unit 613, a sensor data transmission processing unit 614, collection instruction reception processing unit 615, an application data acquisition processing unit 616, and an application data transmission processing unit 617 as software-based processing functional units.

Each of these processing functional units is realized by causing the hardware processor 61A to execute a program stored in the program memory 61B. The control unit 61 may also be implemented in a variety of other forms, including integrated circuits such as ASICs and FPGAs. It should be noted that these processing functions may not be realized using the program stored in the program memory 61B, but may be realized using the program provided through the communication network.

The camera video acquisition processing unit 611 performs a process of acquiring the video data output from the camera CM via the input/output interface 63, and storing the acquired video data in the camera video storage unit 621.

The sensor data acquisition processing unit 612 performs a process of acquiring the sensor data output from the sensors SS1 to SSj via the input/output interface 63, and storing the acquired sensor data in the sensor data storage unit 622.

The setting processing unit 613 performs a process of receiving information (algorithms, thresholds, or the like) representing the conditions of the image data collection process, input by the operator of the on-board device 60, for example, from a management terminal used by the operator of the on-board device 60 via the input/output interface 63 or the communication interface 64, and storing the information in the setting information storage unit 623. As the input/output unit IO, an input device having a keyboard and a mouse, an audio input device, an independent display, and the like can be used.

The sensor data transmission processing unit 614 performs a process of transmitting the data stored in the sensor data storage unit 622 to the server 1 via the communication interface 64.

The collection instruction reception processing unit 615 performs a process of receiving the image data collection instruction transmitted from the server 1 via the communication interface 64.

The application data acquisition processing unit 616 acquires (1) the camera image data stored in the camera video storage unit 621 and (2) the sensor data collected from the sensors SS1 to SSj at the time of photographing the camera image data among the pieces of sensor data stored in the sensor data storage unit 622 according to the image data collection instruction received by the collection instruction reception processing unit 615. If the image data to be collected includes information that can identify the image data, such as the position information of the photographing source vehicle and the photographing time information, the sensor data stored in the sensor data storage unit 622 may not be the acquisition target.

The application data transmission processing unit 617 performs a process of transmitting the data acquired by the application data acquisition processing unit 616 to the server 1 as application data via the communication interface 64.

When there is a plurality of servers, an optimum server may be selected as the destination on the basis of the degree of network congestion, the magnitude of delay, and the like.
(Operation)

Next, the operation of the system configured as described above will be described.

In the present embodiment, the image data collection system reduces communication traffic (hereinafter sometimes referred to as image traffic) related to image data in a mobile network between the mobile body 6 and the server 1, thereby reducing communication delay and smoothening the operation of an application.

The image data collection system collects the data required for the application without reducing the amount of information as much as possible while reducing the image traffic.

Examples of applications include applications that monitor obstacles on the road and applications that create static maps. Further, the application of the image data collection system is not limited to the above.

When the application is an application for monitoring obstacles on the road, the image data collection system narrows down the mobile bodies 6 which are image data collection targets from a plurality of mobile bodies.

When the application is an application that creates a static map, the image data collection system reduces the amount of collected image data.

An application for monitoring obstacles will be described. This application can acquire image data photographed by an on-board camera and monitor the movement of obstacles on the road, changes in the state of obstacles, and the like.

This monitoring is expected to be applied to, for example, a safe driving support technology that notifies a vehicle traveling around an obstacle that the obstacle has moved, or an automatic driving technology that allows a vehicle to automatically drive so as to avoid a collision between the vehicle and the obstacle.

In this embodiment, it is assumed that an obstacle on the road is found in advance and the type and rough position information of the obstacle are managed on the server 1.

In the present embodiment, it is desirable that image data in which an obstacle is photographed is collected and image data in which an obstacle is photographed from various angles is collected.

Figure 6:
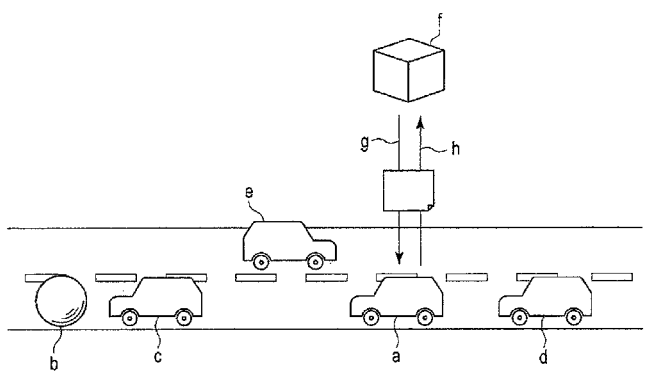
FIG. 6 is a diagram illustrating an example in which the image data collection system according to the first embodiment of the present invention is applied to the monitoring of obstacles.

FIG. 6 is a diagram illustrating an example in which the image data collection system according to the first embodiment of the present invention is applied to the monitoring of obstacles.

The image data collection system selects a vehicle which is an image data collection destination for individual applications that manage vehicle metadata on the server 1 and monitors obstacles using this data.

The metadata is, for example, the position information of the vehicle, the type of an on-board sensor, the specifications, and the data calculated using them.

In the example illustrated in FIG. 6, a vehicle "a" is traveling in the first lane on the road, and an obstacle "b" is present at a position in front of the vehicle "a" by a certain distance in the traveling direction.

Further, in the same lane, a vehicle "c" is traveling between the vehicle "a" and the obstacle "b", and a vehicle "d" is traveling behind the vehicle "a". The traveling directions of the vehicles "a", "c", and "d" are the same. Further, the specifications of the camera mounted on the vehicle "d" are lower than the specifications of the cameras mounted on the vehicles "a" and "c".

Further, a vehicle "e" is traveling in the vicinity of the vehicle "a" in the opposite lane facing the lane in which the vehicles "a", "c", and "d" are traveling.

Each vehicle transmits metadata to a server "f". The server "f" selects an appropriate vehicle as a request destination for transmitting image data for monitoring the obstacle "b" on the basis of the metadata from each vehicle. Here, the vehicle "a" in which the obstacle "b" is located within the photographing range of the mounted camera is selected, and an image data transmission instruction "g" is transmitted to the vehicle "a".

On the other hand, the vehicle "c" is not selected as the request destination because it is too close to the obstacle "b". The vehicle "d" is not selected as a request destination because the specifications of the mounted camera are low as described above. A vehicle "i" is not selected as a request destination because the obstacle "b" is not located within the photographing range of the mounted camera.

According to the transmission instruction "g", the vehicle "a" transmits the image data "h" photographed by the on-board camera to the server "f".

Here, the definition and classification of obstacles will be described. FIGS. 7A, 7B, and 7C are diagrams illustrating an example of the definition and classification of obstacles in a table format.

Obstacles are defined herein as anything that is present around the road and impedes driving or movement.

In FIGS. 7A, 7B and 7C, it is assumed that the stop time is within 5 minutes and the parking time is greater than 5 minutes.

It is assumed that the behavior pattern of the obstacle does not include the state where the mobile body is "always stopped and parked". This is because even if the obstacle itself is static, it is mostly removed by manual intervention.

Since there are obstacles that move frequently, it is possible that the behavior pattern is "always moving". However, since these obstacles will eventually stop, it is assumed that the above-mentioned "always moving" is included in a pattern that the "stop and parking time" in "stop for a certain period of time and then moving" illustrated in FIGS. 7A, 7B, and 7C is "several seconds or less".

It is assumed that, when a pedestrian or a motorcycle driver (hereinafter sometimes referred to as a driver or the like) has a smartphone or when the function of a GPS sensor mounted in an automobile is turned on, the driver or the like or the automobile can acquire and transmit position information.

On the other hand, it is assumed that, when the driver or the like does not have a smartphone, or the engine of an automobile is turned off and the function of the GPS sensor is turned off, the driver or the automobile cannot acquire or transmit the position information.

It is assumed that, when a vehicle parked on the road, which is an obstacle, starts to move and travels at the same speed as surrounding vehicles, the vehicle is not an obstacle.

It is assumed that an ambulance is not an obstacle. This is because when the ambulance travels near another vehicle, the other vehicle stops.

Figure 8:
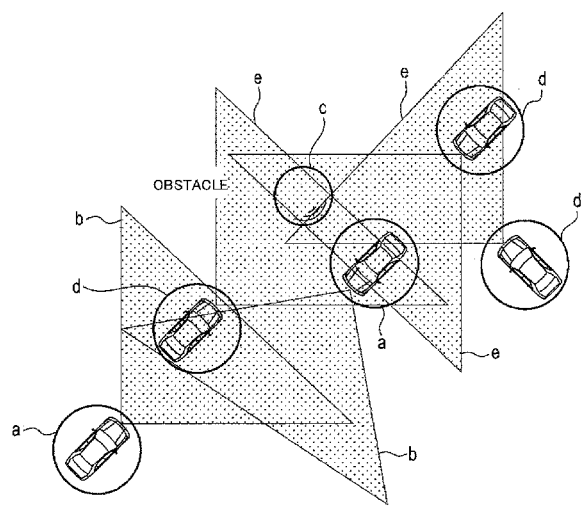
FIG. 8 is a diagram illustrating an example of vehicle selection based on a photographing range of an on-board camera.

Next, vehicle selection based on the photographing range of the on-board camera will be described. FIG. 8 is a diagram illustrating an example of vehicle selection based on the photographing range of the on-board camera.

When the application is an application related to obstacle monitoring, the server 1 estimates the photographing range of the on-board camera of each vehicle. If an obstacle is present within this photographing range, the server 1 selects the vehicle as the image data collection destination and collects image data from this vehicle.

Since the obstacle "c" is not present in the photographing range "b" of the vehicle surrounded by "a" illustrated in FIG. 8, this vehicle is not selected as the collection destination.

On the other hand, since the obstacle "c" is present in the photographing range "e" of a plurality of vehicles surrounded by "d" illustrated in FIG. 8, these vehicles are selected as the collection destination.

When a vehicle is to be selected, the server 1 can narrow down the vehicle which is the image data collection destination on the basis of the information on the state of the vehicle, such as selecting a vehicle having high specifications of the on-board camera. As a result, the amount of communication traffic can be significantly reduced as compared with collecting image data from all vehicles located around an obstacle.

In the example illustrated in FIG. 8, it is assumed that the on-board camera is a front camera, but there is no limitation thereto, and a rear camera, an omnidirectional camera, a spherical camera, and a compound eye camera are also applicable as the on-board camera.

As in the example illustrated in FIG. 8, when the image data collection destination is selected on the basis of whether an obstacle is present in the photographing range, there is a high possibility that the image data in which the obstacle is included in the photographing range can be collected. It is more effective when the obstacle is a static object.

Figure 9:
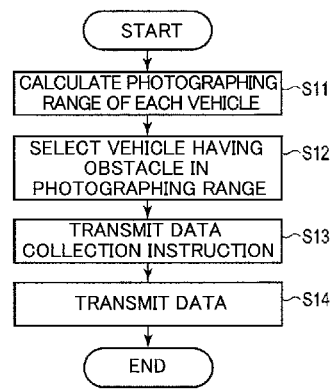
FIG. 9 is a flowchart illustrating an example of a processing operation when the image data collection system according to the first embodiment of the present invention is applied to obstacle monitoring.

FIG. 9 is a flowchart illustrating an example of a processing operation when the image data collection system according to the first embodiment of the present invention is applied to monitoring of obstacles.

The mobile body photographing range calculation unit 113A of the data collection condition determination unit 113 of the server 1 acquires (1) the position information of each vehicle which is the mobile body 6, which is constantly stored in the sensor data storage unit 121, (2) the traveling direction and the angle of view of the camera CM associated with the position information, and (3) the photographable distance of an object and calculates the photographing range of the camera CM mounted on each vehicle using the acquired results (S11).

At this time, the mobile body photographing range calculation unit 113A may predict the position where the mobile body 6 is present when a designated time, for example, several seconds or several milliseconds has elapsed on the basis of information indicating the position, the speed, the traveling direction, and the like of the vehicle and may calculate the photographing range of the camera CM when the designated time has elapsed using the predicted position information.

Subsequently, the mobile body selection unit 113B of the data collection condition determination unit 113 selects a vehicle in which an obstacle is present within the photographing range of the camera CM using (1) the photographing range of each vehicle calculated in S11 and (2) the position information of the obstacle (S12). It is assumed that the position information of the obstacle is stored in the data memory 12 in advance.

The collection instruction transmission processing unit 114 transmits a data collection instruction to the vehicle selected in S12 via the communication interface 14 (S13). The data to be collected includes image data photographed by the camera CM mounted on the selected vehicle. The content of the data collection instruction includes the ID of the vehicle which is a data collection destination, the type and format of the data to be collected, the time window in which the data collection is executed, and the like.

In S11, as described above, using the information of the time window in which the data collection is executed, which is included in the content of the data collection instruction, the data collection instruction can be regarded as the data collection instruction before and after the time when the position information was acquired.

When past image data is stored in the camera video storage unit 621 of the on-board device 60, the past time or time window is set as the photographing time by the setting processing unit 111 of the server 1, and is stored in the setting information storage unit 123. Thus, the past image data can be the target of the collection instruction of the collection instruction transmission processing unit 114.

The collection instruction reception processing unit 615 of the on-board device 60 mounted on the vehicle, which is the data collection instruction destination, receives the data collection instruction via the communication interface 64. The application data acquisition processing unit 616 acquires camera image data and the like stored in the camera video storage unit 621 in response to the data collection instruction. The application data transmission processing unit 617 transmits the acquired data as application data to the server 1 via the communication interface 64 (S14).

The processes of S11 to S14 are repeated at a specified time interval, for example, once per second.

Figure 10:
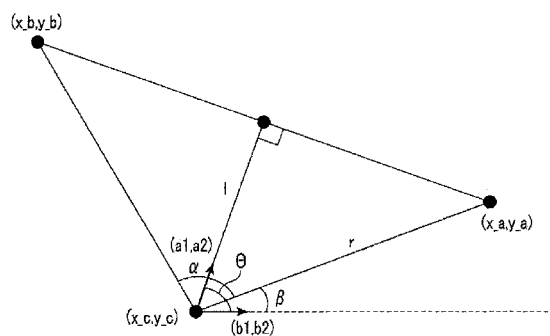
FIG. 10 is a diagram illustrating an example of calculation of a photographing range of a camera.

Next, a specific example of calculating the photographing range in S11 will be described. FIG. 10 is a diagram illustrating an example of calculation of a photographing range of a camera.

It is assumed that the position information of each vehicle, the angle of view of the camera CM, the information on the photographable distance of an object, and the traveling direction are sequentially acquired by the server 1 and are held on this server.

Here, the procedure of calculating the end points (x_a, y_a), (x_b, y_b) of the photographing range using the position information (x_c, y_c) of the camera CM, the angle of view α of the camera CM, and the photographable distance 1 of the object is illustrated below.
(Calculation Procedure)

The unit vector of the traveling direction of the vehicle is defined as follows.

$$\vec{a}=(a_1,a_2)$$

The unit vector in the X-axis direction is defined as follows.

$$\vec{b}=(b_1,b_2)$$

The angle formed by both vectors is defined as θ. At that time, cos θ is calculated from Equation (1) below.

$$\cos\theta = \frac{\vec{a}\times\vec{b}}{|\vec{a}||\vec{b}|} = \frac{a_1b_1 + a_2b_2}{\sqrt{a_1^2+a_2^2}\sqrt{b_1^2+b_2^2}} \qquad (1)$$

The procedure of calculating the end points (x_a, y_a) will be described. Assuming that the angle formed by the unit vector in the X-axis direction and the radius r is β, Equation (2) below holds.

cos β=cos(θ−α/2)(from the addition theorem of trigonometric functions)=cos θcos α+sin θ sin β  (2)

Equations (3) and (4) below are established by the center C (x_c, y_c), which is the position of the camera CM, and the equations of a circle with radius r x=a+r·cos θ, y=b+r·sin θ.

x_a=r·cos β+x_c  (3)

y_a=r·sinβ+y_c  (4)

In Equation (2) above, Equation (5) below holds.

β=θ−2/α  (5)

Then, when the right side of Equation (5) is substituted into β of Equations (3) and (4), the end points (x_a, y_a) are represented by Equation (6) below.

(x_a,y_a)=(r·cos(θ−α/2)+x_c,r·sin (θ−2/α)+y_c)  (6)

According to Equation (6), the mobile body photographing range calculation unit 113A can calculate the end points (x_a, y_a).

Next, the procedure of calculating the end points (x_b, y_b) will be described.

(x_b, y_b) is a coordinate point obtained by rotating (x_a, y_a) by a degrees around (x_c, y_c).

Equations (7) and (8) below hold from the linear transformation of rotational movement.

x_b=cos α(x_a−x_c)−sin α(y_a−y_c)+x_c  (7)

y_b=sin α(x_a−x_c)+cos α(y_a−y_c)+y_c  (8)

From Equations (7) and (8) above, the end points (x_b, y_b) are represented by Equation (9) below.

(x_b,y_b)=((x_a−x_c) cos α−(y_a−y_c) sin α+x_c, (x_a−x_c) sin α−(y_a−y_c) cos α+y_c)  (9)

The procedure of calculating the above-mentioned radius r will be described.

From the triangle theorem, Equation (10) below holds.

r/1=cos(α/2)  (10)

Therefore, the radius r is calculated by Equation (11) below.

r=1·cos(2/α)  (11)

According to the above, the mobile body photographing range calculation unit 113A can calculate the photographing range.

Next, the data transmission in S14 will be supplemented.

In the data transmission in S14, preprocessing may be performed.

Examples of the preprocessing for the image data include compression coding, but thinning processing or processing for trimming only the obstacle portion may be performed as the preprocessing.

As the thinning process, for example, the application data acquisition processing unit 616 of the on-board device 60 selects image data when the position of an obstacle has been changed (that is, the obstacle has moved) in the image data stored in the camera video storage unit 621. The application data transmission processing unit 617 transmits the selected image data to the server 1. As a result, the unselected image data among the pieces of data stored in the camera video storage unit 621 is not transmitted to the server 1. As a result, the amount of image data transmitted to the server 1 is significantly reduced as compared with the case where the thinning process is not performed.

There is a plurality of methods for detecting a change in the position of an obstacle, and examples thereof include the following methods.

For example, the application data acquisition processing unit 616 estimates the position of the obstacle in the vehicle, and compares the estimated position with the position information of the obstacle acquired in advance from the server 1.

There is also a plurality of methods for estimating the position of an obstacle. For example, the estimated value of the position of the obstacle is calculated by a known method, such as "T. Vincenty, Direct and Inverse Solutions of Geodesics on the Ellipsoid with application of nested equations, Survey Review, vol. 23, no. 176, pp. 88-93, 1975" using (1) the position information acquired by the GPS sensor, (2) the position of the obstacle on an image, acquired from the image data, and (3) the distance to the obstacle acquired from the radar.

When this calculated value is compared with the position information of the obstacle acquired in advance from the server 1, and the difference is equal to or more than a certain value, it is determined that a clear change in the position of the obstacle has occurred, that is, the obstacle has moved.

The position of the obstacle may be estimated from, for example, the object detection result of the image data and the specification information of the camera, or may be estimated by comparing the point cloud data obtained by LiDAR and the object detection result of the image data.

In the first embodiment, there is a high possibility that the obstacles of which the "stop time" is "several tens of minutes", "several hours", and "several days or more" in the behavior patterns illustrated in FIGS. 7A, 7B, and 7C are included in the photographing range of the camera CM, and the obstacles are effective in calculating the photographing range.

As an example of a pattern that has a large effect on this possibility, the longer the stop time of an obstacle, the more effective it is in calculating the photographing range. That is, the longer the "stop time" in the "stop for a certain period of time and then moving" of the above-mentioned behavior pattern, the more effective.

In addition, as an example of obstacles having an effect on the above-mentioned possibility, the more accurate the position information of the obstacle obtained in advance, the more effective it is in calculating the photographing range. That is, the effectiveness related to calculation of the photographing range is high in the order of the types of obstacles illustrated in FIGS. 7A, 7B, and 7C are "those that acquire and provide position information by themselves", "those that can acquire position information by themselves but do not provide the same", and "those that cannot acquire and provide position information by themselves".

Next, an application that creates a static map will be described. This application can reproduce the road surface condition as a static map on the server 1 by processing the road surface image data illustrated by the on-board camera images from each vehicle and connecting these images.

This static map is effective for grasping the condition of the road surface, for example, dents and cracks on the road surface, and grasping changes in the white line or the lane of the sidewalk.

For example, it is expected to be applied to safe driving support technology that outputs a warning to the driver when the road surface condition is bad, or automatic driving technology that allows a vehicle to automatically drive so as to slow down the driving speed when the road surface condition is bad.

It is desirable that the collected on-board camera image has no obstruction on the road surface photographed in this image and the road surface in the widest possible range is photographed in the image. In addition, the scenery that may appear in the upper portion of the image is unnecessary as information for grasping the condition of the road surface.

Figure 11:
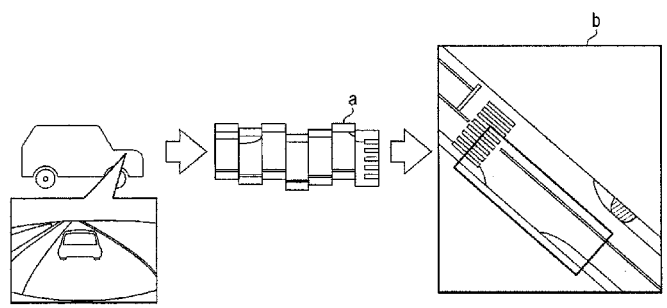
FIG. 11 is a diagram illustrating an example of creating a static map.

FIG. 11 is a diagram illustrating an example of creation of a static map.

"a" illustrated in FIG. 11 illustrates an example of an on-board camera image collected from each vehicle, and "b" illustrated in FIG. 11 illustrates an example of a created static map. This static map may illustrate, for example, dents and cracks on the road surface.

Figure 12:
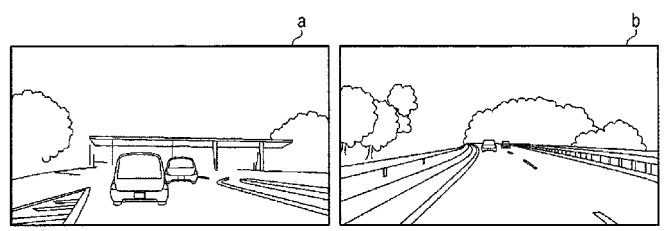
FIG. 12 is a diagram illustrating an example of collected on-board camera images.

FIG. 12 is a diagram illustrating an example of the collected on-board camera images.

"a" illustrated in FIG. 12 is an example of an undesirable on-board camera image. In this image, since there are relatively many obstruction on the road surface, and the range of the road surface illustrated in the image is relatively narrow, this on-board camera image is not suitable as an image constituting a static map.

"b" illustrated in FIG. 12 is an example of a desirable on-board camera image. In this image, since there are relatively few obstructions on the road surface, and the range of the road surface illustrated in the image is relatively wide, this on-board camera image is suitable as an image constituting a static map.

Figure 13:
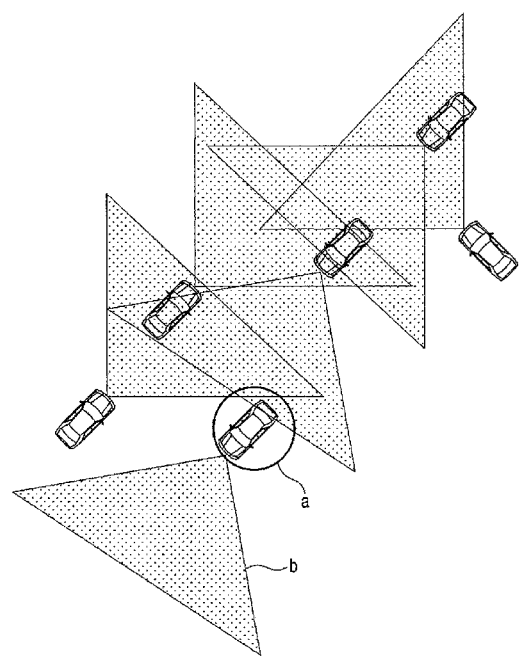
FIG. 13 is a diagram illustrating an example of vehicle selection based on a photographing range of an on-board camera.

Next, vehicle selection based on the photographing range of the on-board camera will be described. FIG. 13 is a diagram illustrating an example of vehicle selection based on the photographing range of the on-board camera.

When the application is an application related to the creation of a static map, and there is no obstruction, for example, another vehicle in the on-board camera image data photographed by a certain vehicle, the vehicle which is a photographing source of the image is specified as the collection destination of the image data constituting the static map, and the image photographed by this vehicle is collected as the image constituting the static map.

In the following, an example in which a vehicle which is a photographing source of the image is specified when there is no obstruction, for example, another vehicle, in the on-board camera image data will be described. However, the present invention is not limited to this, and for example, a vehicle which is a photographing source of the image and in which the number of obstructions photographed in the on-board camera image data satisfies a predetermined condition and is small may be specified as the collection destination. Moreover, a vehicle which is a photographing source of the image and in which the occupancy range of an obstruction in the on-board camera image data satisfies a predetermined condition and is small may be specified as the collection destination.

Since there is no obstruction within the photographing range "b" from the vehicle surrounded by "a" illustrated in FIG. 13, this vehicle is selected as the collection destination of the image data constituting the static map.

On the other hand, since there are obstructions in the photographing range from the vehicle not surrounded by "a" illustrated in FIG. 13, these vehicles are not selected as the collection destination of the image data constituting the static map.

When the vehicle that is the collection destination of the image data that constitutes the static map is to be selected, the server 1 may also further narrow down the collection destination vehicles of the image data on the basis of the vehicle state information such as selecting the vehicle with high specifications of the on-board camera. As a result, the amount of communication traffic can be significantly reduced as compared with collecting image data from all vehicles located around the obstruction.

In the example illustrated in FIG. 13, it is assumed that the on-board camera is a front camera, but there is no limitation thereto, and a rear camera, an omnidirectional camera, a spherical camera, and a compound eye camera are also applicable as the on-board camera.

When the collection destination of the image data is selected on the basis of whether there is an obstruction in the photographing range as in the example illustrated in FIG. 13, it is possible to collect images on which there is no obstruction and with which it is easy to diagnose the road surface as an image suitable for creating a static map.

Figure 14:
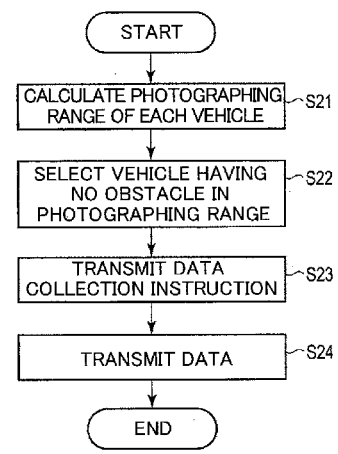
FIG. 14 is a flowchart illustrating an example of a processing operation when the image data collection system according to the first embodiment of the present invention is applied to the creation of a static map.

FIG. 14 is a flowchart illustrating an example of a processing operation when the image data collection system according to the first embodiment of the present invention is applied to the creation of a static map. Here, it is assumed that the obstruction is another vehicle with respect to a vehicle which is a photographing source of the image data, but any other object that can be an obstruction may be used as long as the position information can be grasped.

First, similarly to S11, the mobile body photographing range calculation unit 113A of the data collection condition determination unit 113 of the server 1 calculates the photographing range of the camera CM mounted on each vehicle (S21).

Subsequently, the mobile body selection unit 113B of the data collection condition determination unit 113 selects a vehicle having no obstruction within the photographing range of the camera CM using (1) the photographing range of each vehicle calculated in S21 and (2) the position information of another vehicle which is an obstruction (S22).

At this time, the predicted information of the position information of the obstruction may be used in S22 using the position information predicted in S21 described in S11.

Similarly to S13, the collection instruction transmission processing unit 114 transmits a data collection instruction to the vehicle selected in S22 via the communication interface 14 (S23).

Subsequently, similarly to S14, the collection instruction reception processing unit 615 of the on-board device 60 mounted on the vehicle, which is the data collection instruction destination, receives the data collection instruction via the communication interface 64. The application data acquisition processing unit 616 acquires camera image data and the like stored in the camera video storage unit 621 in response to a collection instruction. The application data transmission processing unit 617 transmits the acquired data as application data to the server 1 via the communication interface 64 (S24).

The processes of S21 to S24 are repeated at a specified time interval, for example, once per second.

As described above, in the first embodiment of the present invention, the server selects a vehicle suitable as a collection destination of image data on the basis of the photographing range, position information, and the like of the camera mounted on each vehicle and collects image data from this vehicle. Therefore, the traffic related to the communication of the image data between the on-board device and the server can be reduced, and the communication delay can be reduced.

In addition, it is possible to collect image data and the like required for the application while maintaining the amount of information as much as possible while reducing traffic. Therefore, the data required for the application can be efficiently collected and the operation of the application can be smoothened.

Second Embodiment

Next, the second embodiment will be described. In each of the following embodiments, detailed description of the same configuration and operation as in the first embodiment will be omitted. The configuration of the image data collection system according to the second embodiment is the same as that of the first embodiment.

However, in the second embodiment, a mobile body selection unit 113B of the server 1 selects a vehicle which is the collection destination of image data using speculative execution.

Speculative execution is used, for example, to reduce delays in network battle games.

In network battle games, the operation contents of an opponent player are received by communication, and the movements of the characters of a host player and the opponent player on the screen are rendered. At this time, in addition to the communication delay, since the rendering process is also delayed, the delay is conspicuous when playing against an opponent player in a remote location. Therefore, the delay of the screen display is reduced by predicting all patterns of the operations performed by the opponent player at the next moment and performing a process of rendering the opponent player in advance on the basis of the prediction result in each pattern.

Figure 15:
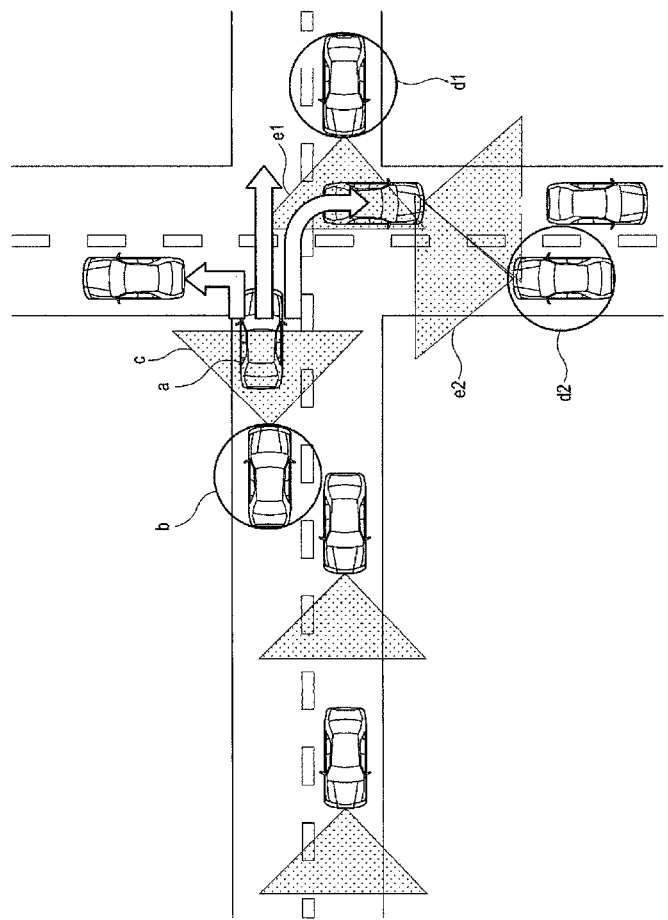
FIG. 15 is a diagram illustrating an example of vehicle selection by an image data collection system according to a second embodiment of the present invention.

FIG. 15 is a diagram illustrating an example of vehicle selection by the image data collection system according to the second embodiment of the present invention.

When the application is an application for monitoring obstacles, the mobile body selection unit 113B of the server 1 predicts the future position of the obstacle on the basis of the information indicating the type, the current position, the speed, the traveling direction, and the like of the obstacle. Further, the mobile body selection unit 113B predicts a vehicle that is likely to be in a position where an obstacle can be photographed, and selects this vehicle as a collection destination of image data.

"a" illustrated in FIG. 15 is a road standing vehicle corresponding to an obstacle (hereinafter referred to as an obstacle vehicle "a"). Since the current obstacle vehicle "a" falls within the photographing range "c" of the on-board camera of the vehicle surrounded by "b" illustrated in FIG. 15, the vehicle surrounded by "b" is selected as the image data collection destination.

In addition, in the future after a predetermined time, since the obstacle vehicle "a" in the future after the same predetermined time falls within the photographing range "e1" of the on-board camera surrounded by "d1" illustrated in FIG. 15, the vehicle surrounded by "d1" is selected as the image data collection destination.

Similarly, in the future after the same predetermined time, since the obstacle vehicle "a" in the future after the same predetermined time falls within the photographing range "e2" of the on-board camera surrounded by "d2" illustrated in FIG. 15, the vehicle surrounded by "d2" is selected as the image data collection destination.

As a result, in the second embodiment, there is a high possibility that image data in which an obstacle is photographed can be collected as compared with the first embodiment. This is particularly effective when obstacles move.

Figure 16:
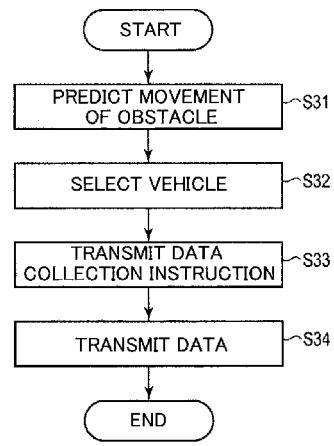
FIG. 16 is a flowchart illustrating an example of a processing operation when the image data collection system according to the second embodiment of the present invention is applied to the monitoring of obstacles.

FIG. 16 is a flowchart illustrating an example of a processing operation when the image data collection system according to the second embodiment of the present invention is applied to monitoring of obstacles.

In the second embodiment, it is assumed that all movement patterns of obstacles are stored in advance in the data memory 12 of the server 1 for each type of obstacles.

For example, if an obstacle is a vehicle parked on the road, the vehicle may stop, move forward, turn right, turn left, or move backward. Each pattern may include information indicating the direction and the moving distance from the current position of the obstacle after the elapse of a predetermined time.

The mobile body selection unit 113B of the data collection condition determination unit 113 of the server 1 compares (1) the type and position information of an obstacle acquired in advance and (2) the movement pattern of each obstacle stored in advance in the data memory 12 to derive the predicted positions of all obstacles (S31).

The mobile body selection unit 113B selects vehicles in which an obstacle is included in the photographing range as the image data collection destination using (1) all predicted positions of target obstacles derived in S31 and (2) the photographing range calculated by the mobile body photographing range calculation unit 113A using the position information of each vehicle, collected constantly from each vehicle and stored in the data memory 12 (S32). Similarly to the first embodiment, the position information of the vehicle (including other vehicles) may be predicted information.

Similarly to S13, the collection instruction transmission processing unit 114 transmits a data collection instruction to the vehicle selected in S32 via the communication interface 14 (S33).

Similarly to S14, the collection instruction reception processing unit 615 of the on-board device 60 mounted on the vehicle, which is the data collection instruction destination, receives the data collection instruction via the communication interface 64. The application data acquisition processing unit 616 acquires camera image data and the like stored in the camera video storage unit 621 in response to a collection instruction. The application data transmission processing unit 617 transmits the acquired data as application data to the server 1 via the communication interface 64 (S34).

The processes from S31 to S34 are repeated at a specified time interval, for example, once per second.

In the second embodiment, depending on the type of obstacle, there is a high possibility that the obstacle is included in the photographing range, which is effective in vehicle selection.

As an example of a pattern that has a large effect on this possibility, since a higher frequency of movement of an obstacle results in the lower frequency of unnecessary image data to be collected than the longer stop time of an obstacle, the higher movement frequency is effective in selecting vehicles. That is, the shorter the "stop time" in "stop for a certain period of time and then moving" of the behavior pattern of the obstacle illustrated in FIGS. 7A, 7B, and 7C, the more effective it is in selecting vehicles. The same applies when the behavior pattern of the obstacle corresponds to the above-mentioned "always moving".

As an example of a pattern with a moderate effect on the above-mentioned possibility, since an obstacle moving along a road results in the lower frequency of unnecessary image data to be collected than an obstacle that does not move along a road, the obstacle moving along the road is effective in selecting vehicles. That is, an obstacle of which the behavior pattern is "moving along road", illustrated in FIGS. 7A, 7B, and 7C is more effective in selecting vehicles.

Third Embodiment

Next, a third embodiment will be described. The configuration of the image data collection system according to the third embodiment is the same as that of the first embodiment.

the image is known, the area where the obstructed portion is removed from the fan-shaped photographing range is used as the basic score.

In each photographing range, processing is performed such that a portion that overlaps the photographing range of the collected image, which is an image already collected by the server 1, is excluded from the target of further collection.

However, the above-mentioned exclusion requirement is relaxed according to the degree of similarity based on the difference in the photographing angle in each photographing range.

Figure 17:
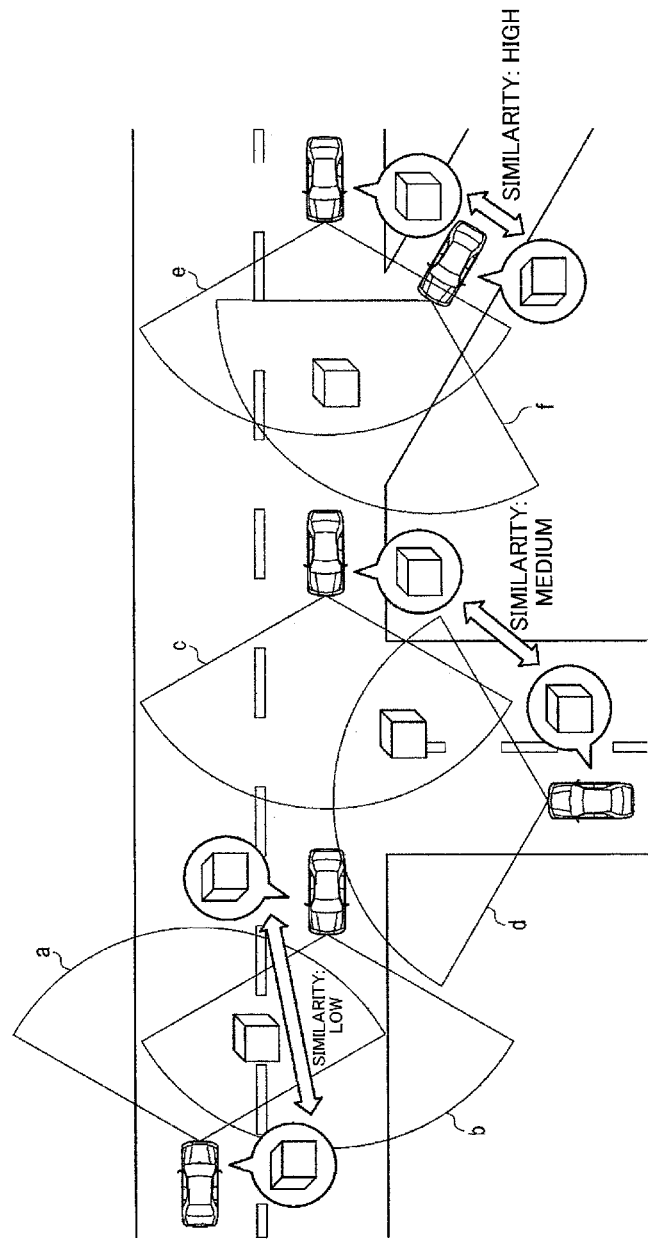
FIG. 17 is a diagram illustrating an example of vehicle selection by an image data collection system according to a third embodiment of the present invention.

The angle difference between the photographing ranges "a" and "b" illustrated in FIG. 17 is 180 degrees, that is, an angle corresponding to the opposite, and the similarity of the photographing results of an obstacle present in the overlapping range of the photographing ranges "a" and "b" is low.

The angle difference between the photographing ranges "c" and "d" illustrated in FIG. 17 is 90 degrees, and the similarity of the photographing results of obstacles present in the overlapping range of the photographing ranges "c" and "d" is medium.

The angle difference between the photographing ranges "e" and "f" illustrated in FIG. 17 is smaller than 90 degrees, and the similarity of the photographing results of obstacles present in the overlapping range of the photographing ranges "e" and "f" is high.

In the third embodiment, the image data related to the photographing range having a low degree of similarity among the above-mentioned photographing ranges is the image data having a high priority of collection. Further, the image data related to the photographing range having a high degree of similarity is the image data having a low priority of collection.

Next, the above-mentioned score formulation (with time difference) will be described. The score used for priority scoring is represented by, for example, Equations (12), (13), (14), and (15) below. Further, if the following elapsed time, directional difference, and time difference can be used as parameters, the score calculation formula is not particularly limited.

$$\text{Cost} = (\text{Area\_of\_photographing\_range}) \times W_{elapsed\_time} - \sum_{Collected\_images} [(\text{Area\_of\_overlapping\_portion}) \times W_{directional\_difference} \times W_{time\_difference}] \quad (12)$$

$$W_{elapsed\_time} = \begin{cases} 1 - (\text{elapsed\_time})/\tau & ((\text{elapsed\_time}) \leq \tau) \\ 0 & ((\text{elapsed\_time}) > \tau) \end{cases} \quad (13)$$

$$W_{directional\_difference} = \{1 + \cos(\text{directional\_difference})\}/2 \quad (14)$$

$$W_{time\_difference} = \begin{cases} 1 - (\text{time\_difference})/\tau & ((\text{time\_difference}) \leq \tau) \\ 0 & ((\text{time\_difference}) > \tau) \end{cases} \quad (15)$$

However, in the third embodiment, in vehicle selection, priority scoring is performed based on the similarity of the angles of view of the on-board cameras.

FIG. 17 is a diagram illustrating an example of vehicle selection by the image data collection system according to the third embodiment of the present invention. In the third embodiment, for example, the areas of the fan-shaped photographing ranges "a", "b", "c", "d", "e", and "f" of the on-board camera illustrated in FIG. 17 are used as the basic scores. In addition, when a portion that is obstructed by a surrounding vehicle or the like and is not photographed in The "$W_{elapsed\_time}$" in Equation (12) is a weight parameter for preferentially collecting new image data, and is a function that monotonously decreases with the elapse of time.

The "$W_{directional\_difference}$" in Equation (12) is a weight parameter expressing the degree of similarity between the collected image data and the non-collected image data, and is a function that monotonously decreases as the directional difference of the photographing range increases.

The "$W_{time\_difference}$" in Equation (12) is a weight parameter expressing the degree of similarity with the collected data, and is a function that monotonously decreases as the time difference of the photographing time increases.

τ in Equation (13) is the valid period set by the application. Equation (13) illustrates that the score is subtracted according to the elapsed time.

Equation (14) illustrates that the difference in photographing direction is reflected in the degree of exclusion of the score. For example, the exclusion degree is 100% if the difference is 0 degree, and the exclusion degree is 0% if the difference is 180 degrees.

Equation (15) illustrates that the time difference is reflected in the score exclusion degree of the overlapping portion of the photographing range on the basis of the valid period τ set by the application.

Figure 18:
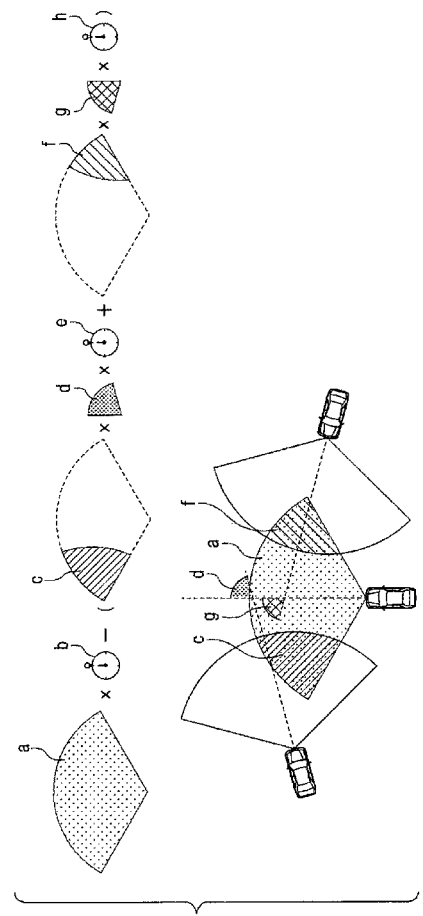
FIG. 18 is a diagram illustrating calculation of a priority score by the image data collection system according to the third embodiment of the present invention.

FIG. 18 is a diagram illustrating calculation of a priority score by the image data collection system according to the third embodiment of the present invention.

"a" illustrated in FIG. 18 corresponds to the area of the photographing range represented by Equation (12) for a pre-collection mobile body, which is a mobile body capable of photographing the pre-collection image data.

"b" illustrated in FIG. 18 corresponds to the $W_{elapsed\_time}$ represented by Equation (12).

"c" illustrated in FIG. 18 corresponds to the area of the overlapping portion represented by Equation (12) for the pre-collection mobile body and the first mobile body on which the camera for obtaining the collected image data is mounted.

"d" illustrated in FIG. 18 corresponds to the $W_{directional\_difference}$ represented by Equation (12) for the pre-collection mobile body and the first mobile body.

"e" illustrated in FIG. 18 corresponds to the $W_{time\_differece}$ represented by Equation (12) for the pre-collection mobile body and the first mobile body. "f" illustrated in FIG. 18 corresponds to the area of the overlapping portion represented by Equation (12) for the pre-collection mobile body and the second mobile body on which the camera for obtaining the collected image data is mounted. "g" illustrated in FIG. 18 corresponds to the $W_{directional\_difference}$ represented by Equation (12) for the pre-collection mobile body and the second mobile body.

"h" illustrated in FIG. 18 corresponds to the $W_{time\_difference}$ represented by Equation (12) for the pre-collection mobile body and the second mobile body.

Next, an example of priority scoring based on the similarity of the angles of view of the photographing range will be described.

Overlapping photographing ranges are unlikely to occur during hours when there are few vehicles.

When there is a plurality of photographing ranges related to the pre-collection image data having the same priority score, the photographing range related to the collection target image data is randomly selected.

Further, the number of pieces of image data to be collected may be adjusted according to the capacity of the server and the communication line.

Figure 19:
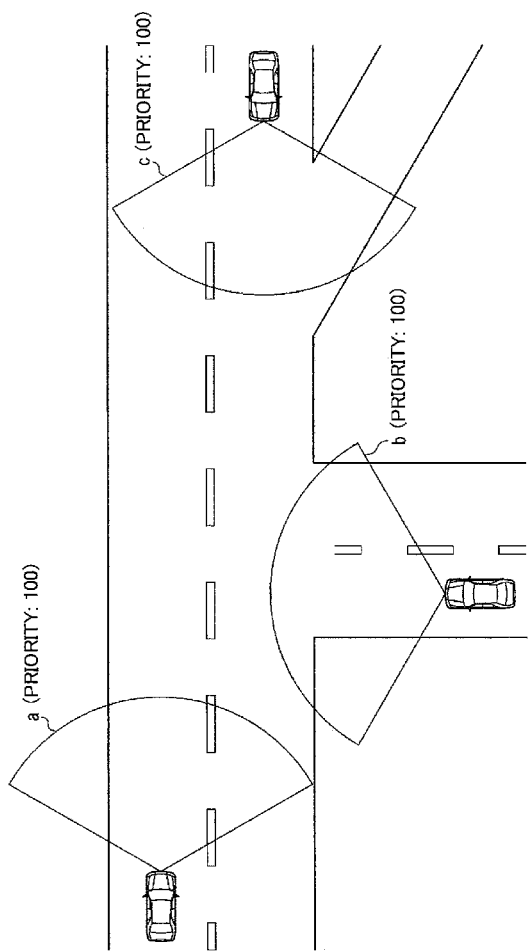
FIG. 19 is a diagram illustrating a first state of priority scoring based on the similarity of the angle of views of the photographing ranges.

FIG. 19 is a diagram illustrating a first state of priority scoring based on the similarity of the angles of view of the photographing range.

In the example illustrated in FIG. 19, there is no overlapping range between the photographing range "a" of the camera mounted on the first vehicle, the photographing range "b" of the camera mounted on the second vehicle, and the photographing range "c" of the camera mounted on the third vehicle.

At this time point, the photographing ranges "a", "b", and "c" are photographing ranges related to non-collected image data, and the priority scores calculated for the photographing ranges are 100, which is the highest.

Figure 20:
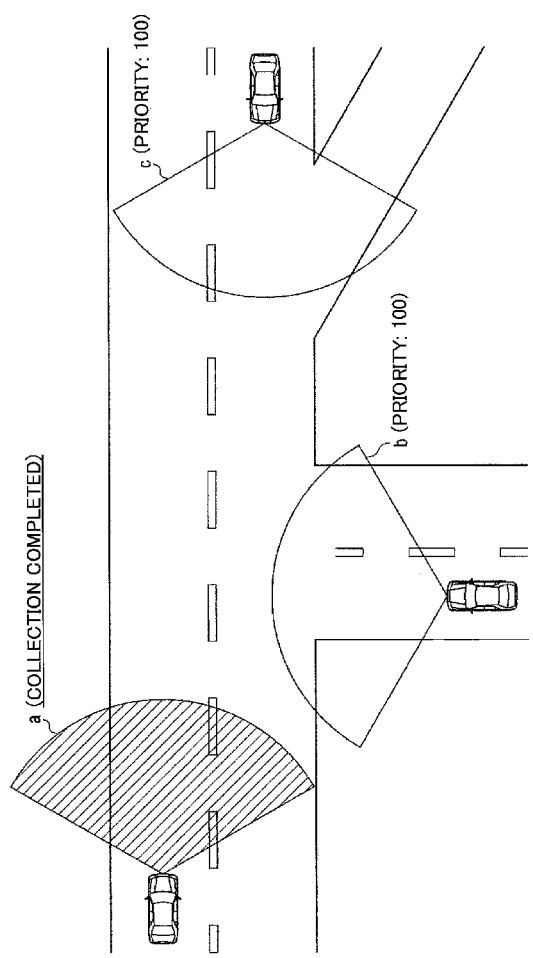
FIG. 20 is a diagram illustrating a second state of priority scoring based on the similarity of the angle of views of the photographing ranges.

FIG. 20 is a diagram illustrating a second state of priority scoring based on the similarity of the angles of view of the photographing range.

In the example illustrated in FIG. 20, since the priority scores calculated for the photographing ranges "a", "b", and "c" related to the non-collected image data illustrated in FIG. 19 are the same 100, the photographing range "a" is randomly selected, and the image data related to this photographing range is newly collected in the server 1.

Figure 21:
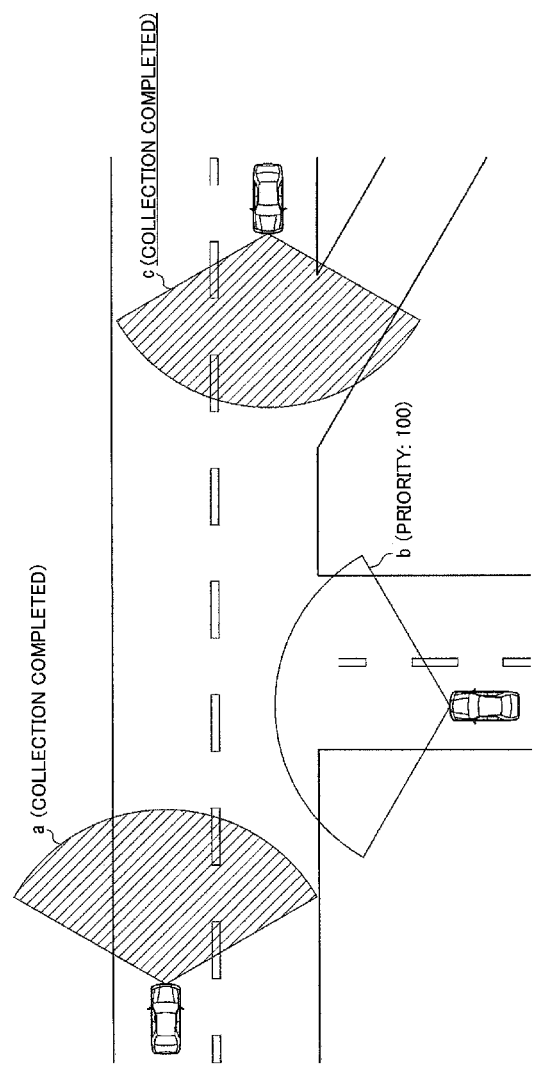
FIG. 21 is a diagram illustrating a third state of priority scoring based on the similarity of the angle of views of the photographing ranges.

FIG. 21 is a diagram illustrating a third state of priority scoring based on the similarity of the angles of view of the photographing range. In the example illustrated in FIG. 21, the priority scores calculated for the photographing ranges "b" and "c" related to the non-collected image data illustrated in FIG. 20 are the same 100, the photographing range "c" is randomly selected, and the image data related to this photographing range is newly collected in the server 1.

Figure 22:
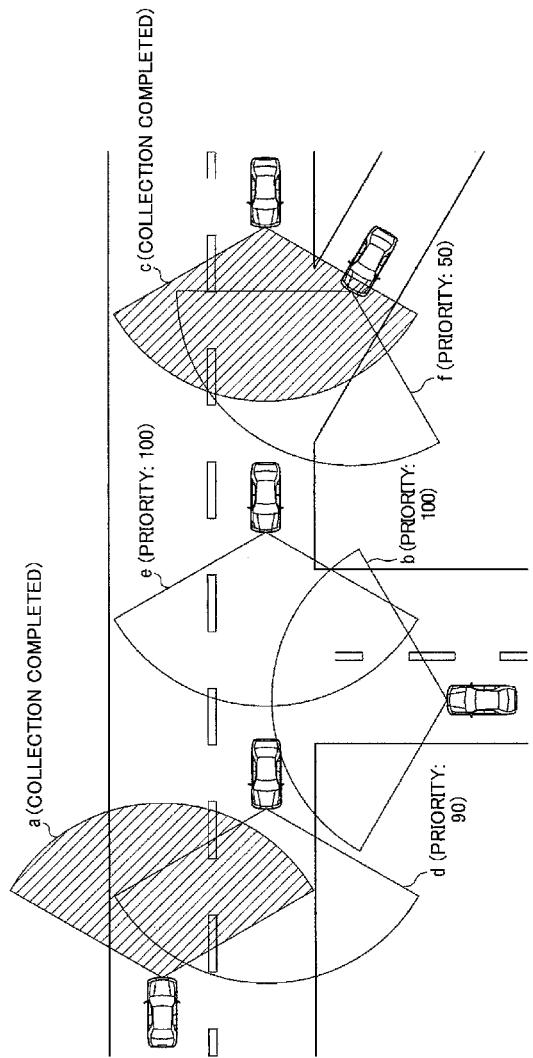
FIG. 22 is a diagram illustrating a fourth state of priority scoring based on the similarity of the angle of views of the photographing ranges.

FIG. 22 is a diagram illustrating a fourth state of priority scoring based on the similarity of the angle of views of the photographing ranges.

In the example illustrated in FIG. 22, a new fourth vehicle is located near the first vehicle, a new fifth vehicle is located near the second vehicle, a new sixth vehicle is located near the third vehicle.

Here, it is assumed that a portion of the photographing range "a" and a portion of the photographing range "d" of the camera mounted on the fourth vehicle overlap each other, a portion of the photographing range "b" and a portion of the photographing range "e" of the camera mounted on the fifth vehicle overlap each other, and a portion of the photographing range "c" and a portion of the photographing range "f" of the camera mounted on the sixth vehicle overlap each other.

Here, it is assumed that the priority score calculated for the photographing range "d" is 90, the priority score calculated for the photographing range "e" is 100, and the priority score calculated for the photographing range "f" is 50. Since there is no photographing range related to the collected image between the photographing range "b" and the photographing range "e", the priority score calculated for the photographing range "e" is 100 as described above.

Figure 23:
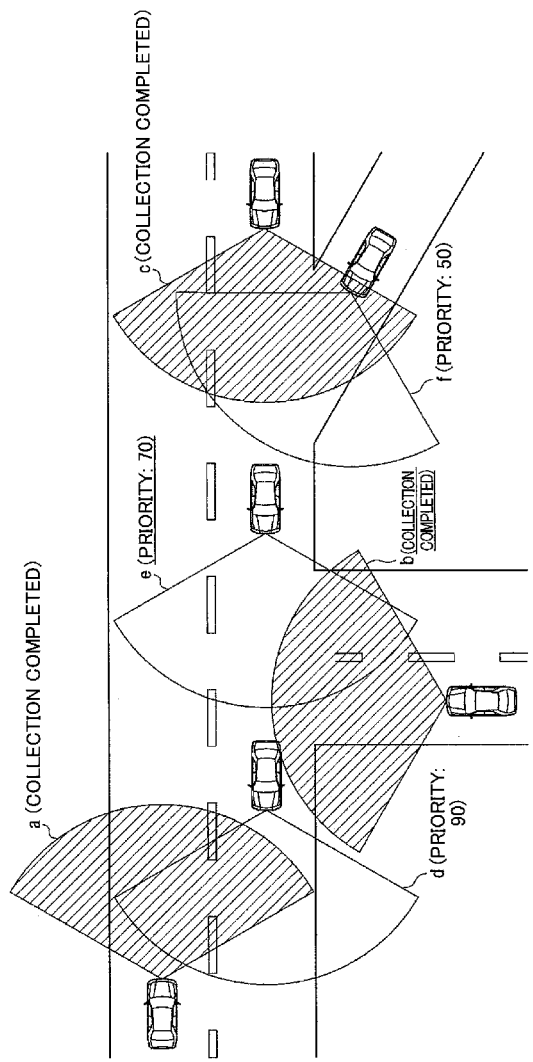
FIG. 23 is a diagram illustrating a fifth state of priority scoring based on the similarity of the angle of views of the photographing ranges.

FIG. 23 is a diagram illustrating a fifth state of priority scoring based on the similarity of the angle of views of the photographing ranges.

In the example illustrated in FIG. 23, the photographing range "b" is randomly selected from the photographing ranges "b" and "e" having the highest priority among the photographing ranges "b", "d", "e", and "f" related to the non-collected image data, and the image data related to this photographing range is newly collected in the server 1. After this collection, the priority score is calculated again for the photographing range "e" that overlaps the photographing range "b" as described above. It is assumed that this priority score has changed from 100 to 70 above.

Figure 24:
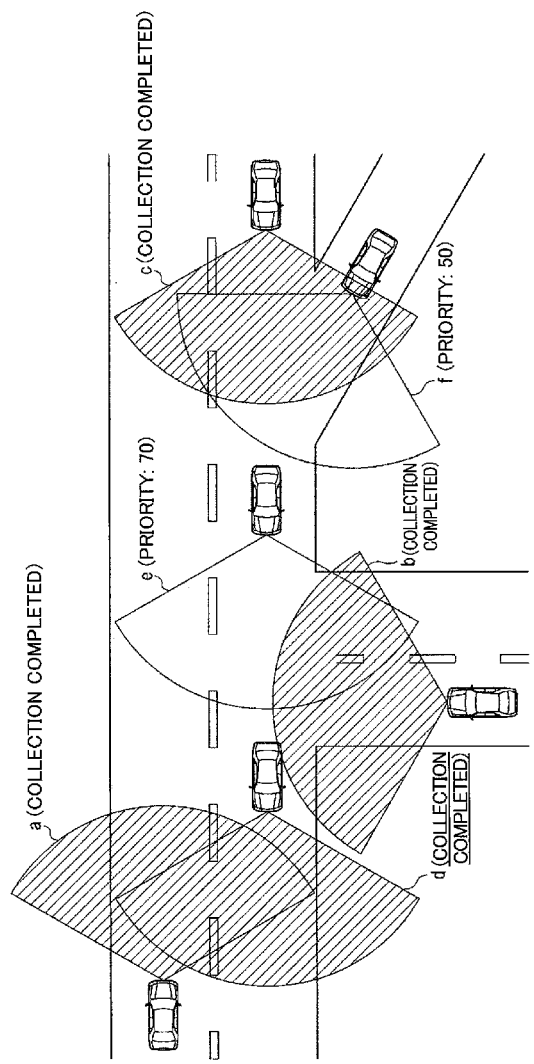
FIG. 24 is a diagram illustrating a sixth state of priority scoring based on the similarity of the angle of views of the photographing ranges.

FIG. 24 is a diagram illustrating a sixth state of priority scoring based on the similarity of the angle of views of the photographing ranges.

In the example illustrated in FIG. 24, the image data related to the photographing range "d" having the highest priority among the photographing ranges "d", "e", and "f" related to the non-collected image data is newly collected in the server 1.

Figure 25:
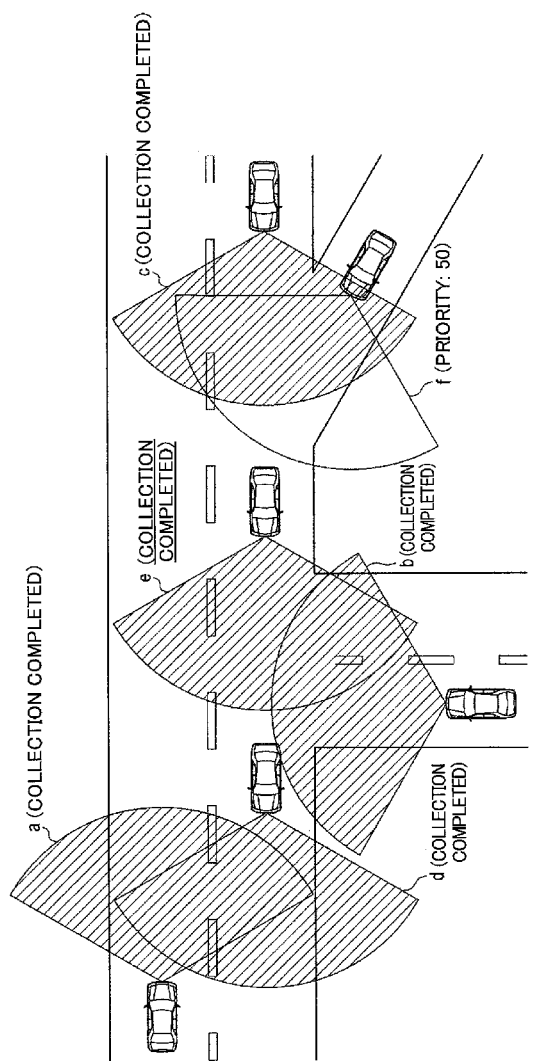
FIG. 25 is a diagram illustrating a seventh state of priority scoring based on the similarity of the angle of views of the photographing ranges.

FIG. 25 is a diagram illustrating a seventh state of priority scoring based on the similarity of the angle of views of the photographing ranges.

In the example illustrated in FIG. 25, the image data related to the photographing range "e" having the highest priority among the photographing ranges "e" and "f" related to the non-collected image data is newly collected in the server 1. The image data related to the remaining photographing range "f" is collected in the server 1 after this collection.

Figure 26:
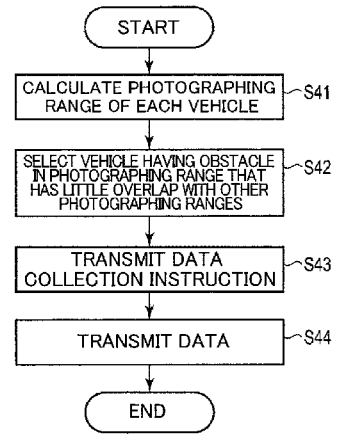
FIG. 26 is a flowchart illustrating an example of a processing operation when the image data collection system according to the third embodiment of the present invention is applied to the monitoring of obstacles.

FIG. 26 is a flowchart illustrating an example of a processing operation when the image data collection system according to the third embodiment of the present invention is applied to monitoring of obstacles.

First, similarly to S11, the mobile body photographing range calculation unit 113A of the data collection condition determination unit 113 of the server 1 calculates the photographing range of the camera CM mounted on each vehicle (S41).

Subsequently, the mobile body selection unit 113B of the data collection condition determination unit 113 selects a vehicle in which an obstacle is present in the photographing range of the camera CM using (1) the photographing range of each vehicle calculated in S41 and (2) the position information of the obstacle. It is assumed that the position information of the obstacle is stored in the data memory 12 in advance.

Further, the mobile body selection unit 113B reads out the photographing position and photographing time related to the image data collected from a certain vehicle from the application data storage unit 122, refers to the read information, and selects a vehicle equipped with a camera CM having a photographing range with little overlap with respect to the photographing range related to the collected image data on the basis of the priority score using Equations (12), (13), (14), and (15) (S42).

Similarly to S13, the collection instruction transmission processing unit 114 transmits a data collection instruction to the vehicle selected in S42 via the communication interface 14 (S43).

Similarly to S14, the collection instruction reception processing unit 615 of the on-board device 60 mounted on the vehicle, which is the data collection instruction destination, receives the data collection instruction via the communication interface 64. The application data acquisition processing unit 616 acquires camera image data and the like stored in the camera video storage unit 621 in response to a collection instruction. The application data transmission processing unit 617 transmits the acquired data as application data to the server 1 via the communication interface 64 (S44).

The processes from S41 to S44 are repeated at a specified time interval, for example, once per second.

In the third embodiment, as compared with the first embodiment, the priority related to collection of image data having a high similarity to the collected image data is lowered by taking the overlapping and similarity of the image data obtained by the vehicle which is an image data collection target and the image data already obtained by the other vehicles into consideration. As a result, image data useful for the application can be efficiently collected.

Similarly to the first embodiment, in the third embodiment, there is a high possibility that the obstacles of which the "stop time" is "several tens of minutes", "several hours", and "several days or more" in the behavior patterns illustrated in FIGS. 7A, 7B, and 7C are included in the photographing range of the camera CM, and the obstacles are effective in calculating the photographing range.

Figure 27:
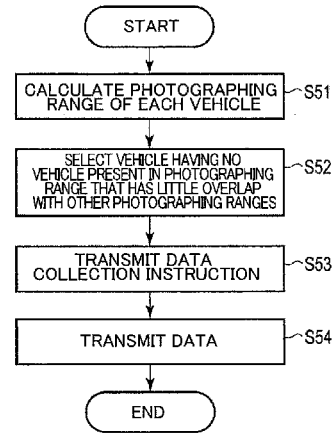
FIG. 27 is a flowchart illustrating an example of a processing operation when the image data collection system according to the third embodiment of the present invention is applied to the creation of a static map.

FIG. 27 is a flowchart illustrating an example of a processing operation when the image data collection system according to the third embodiment of the present invention is applied to the creation of a static map.

First, similarly to S41, the mobile body photographing range calculation unit 113A of the data collection condition determination unit 113 of the server 1 calculates the photographing range of the camera CM mounted on each vehicle (S51).

Subsequently, similarly to S22, the mobile body selection unit 113B of the data collection condition determination unit 113 selects a vehicle in which no obstruction is present in the photographing range of the camera CM using (1) the photographing range of each vehicle calculated in S21 and (2) the position information of other vehicles.

Then, for this selected vehicle, the mobile body selection unit 113B reads out (1) the photographing range of each vehicle calculated in S41, and (2) the photographing position and photographing time related to the image data collected from a certain vehicle, refers to the read information from the application data storage unit 122, and selects a vehicle equipped with the camera CM related to the photographing range with less overlap with respect to the photographing range related to the collected image data on the basis of the priority score using Equations (12), (13), (14), and (15) (S52).

Similarly to S43, the collection instruction transmission processing unit 114 transmits a data collection instruction to the vehicle selected in S52 via the communication interface 14 (S53).

Similarly to S44, the collection instruction reception processing unit 615 of the on-board device 60 mounted on the vehicle, which is the data collection instruction destination, receives the data collection instruction via the communication interface 64. The application data acquisition processing unit 616 acquires camera image data and the like stored in the camera video storage unit 621 in response to a collection instruction. The application data transmission processing unit 617 transmits the acquired data as application data to the server 1 via the communication interface 64 (S54).

The processes from S51 to S54 are repeated at a specified time interval, for example, once per second.

Fourth Embodiment

Figure 28:
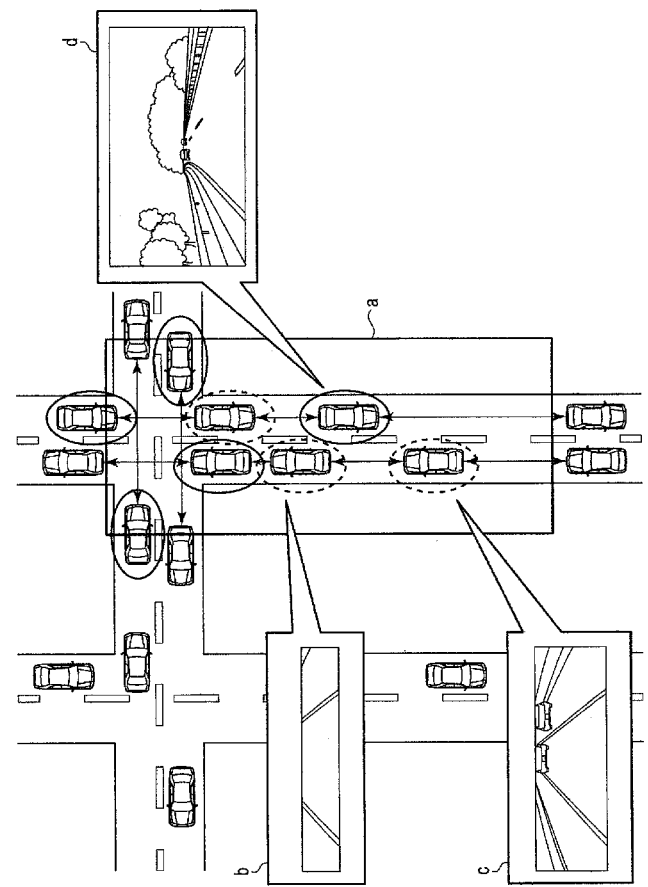
FIG. 28 is a diagram illustrating an example of reducing the amount of image data by an image data collection system according to a fourth embodiment of the present invention.

Next, a fourth embodiment will be described. FIG. 28 is a diagram illustrating an example of reducing the amount of image data by the image data collection system according to the fourth embodiment of the present invention.

In this fourth embodiment, the amount of image data collected by the server 1 is reduced using an inter-vehicle distance.

When the application destination application is an application that creates a static map, an unnecessary range of the images collected from the data collection target vehicle is trimmed for each vehicle located in the range surrounded by "a" illustrated in FIG. 28 according to an inter-vehicle distance between the data collection target vehicle and a vehicle in front of the vehicle or a vehicle located behind the data collection target vehicle.

When the inter-vehicle distance is relatively short, since the occupancy ratio of the vehicle in front or behind to the photographing range of the camera mounted on the data collection target vehicle is relatively high, the trimming range is set to a relatively large range as illustrated by "b" in FIG. 28.

On the other hand, when the inter-vehicle distance is relatively long, the occupancy ratio of the front or rear vehicle to the photographing range of the camera mounted on the data collection target vehicle is relatively low. Therefore, the trimming range is set to a relatively small range as illustrated by "c" in FIG. 28, or the trimming is set so as not to be performed as illustrated by "d" in FIG. 28.

In the fourth embodiment, it is possible to collect a road surface image suitable for a static map, which does not include an obstruction or the like, at a low processing cost.

Figure 29:
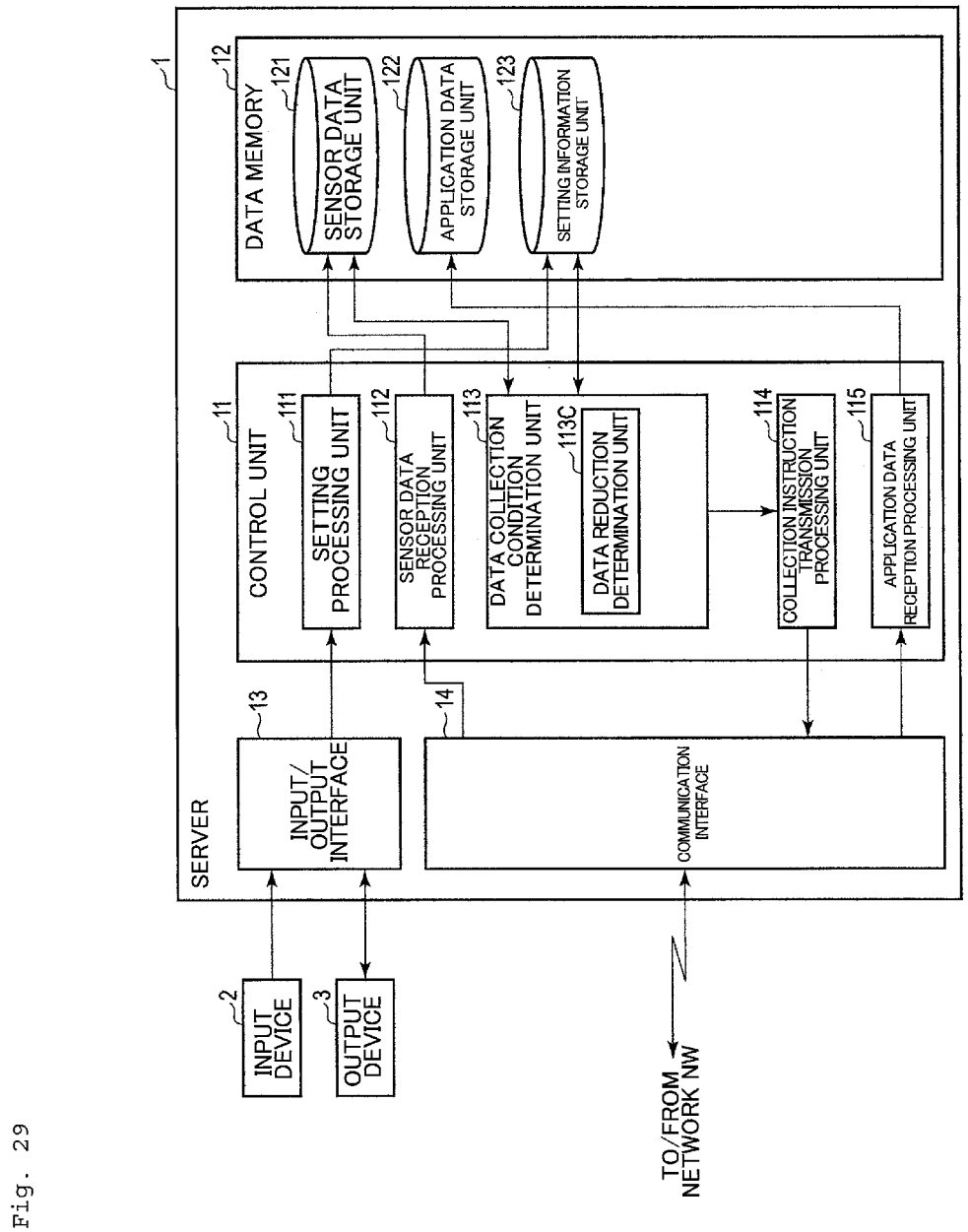
FIG. 29 is a block diagram illustrating an example of a software configuration of a server of an image data collection system according to a fourth embodiment of the present invention.

FIG. 29 is a block diagram illustrating an example of the software configuration of the server 1 of the image data collection system according to the fourth embodiment of the present invention.

As compared with the software configuration of the server 1 of the image data collection system according to the first embodiment illustrated in FIG. 3, the data collection condition determination unit 113 of the control unit 11 of the server 1 of the image data collection system according to the fourth embodiment has a data reduction determination unit 113C instead of the mobile body photographing range calculation unit 113A and the mobile body selection unit 113B illustrated in the first embodiment.

The data reduction determination unit 113C determines the trimming range, which is an unnecessary range of the image data to be collected from the on-board device 60 using the data received from the on-board device 60.

Figure 30:
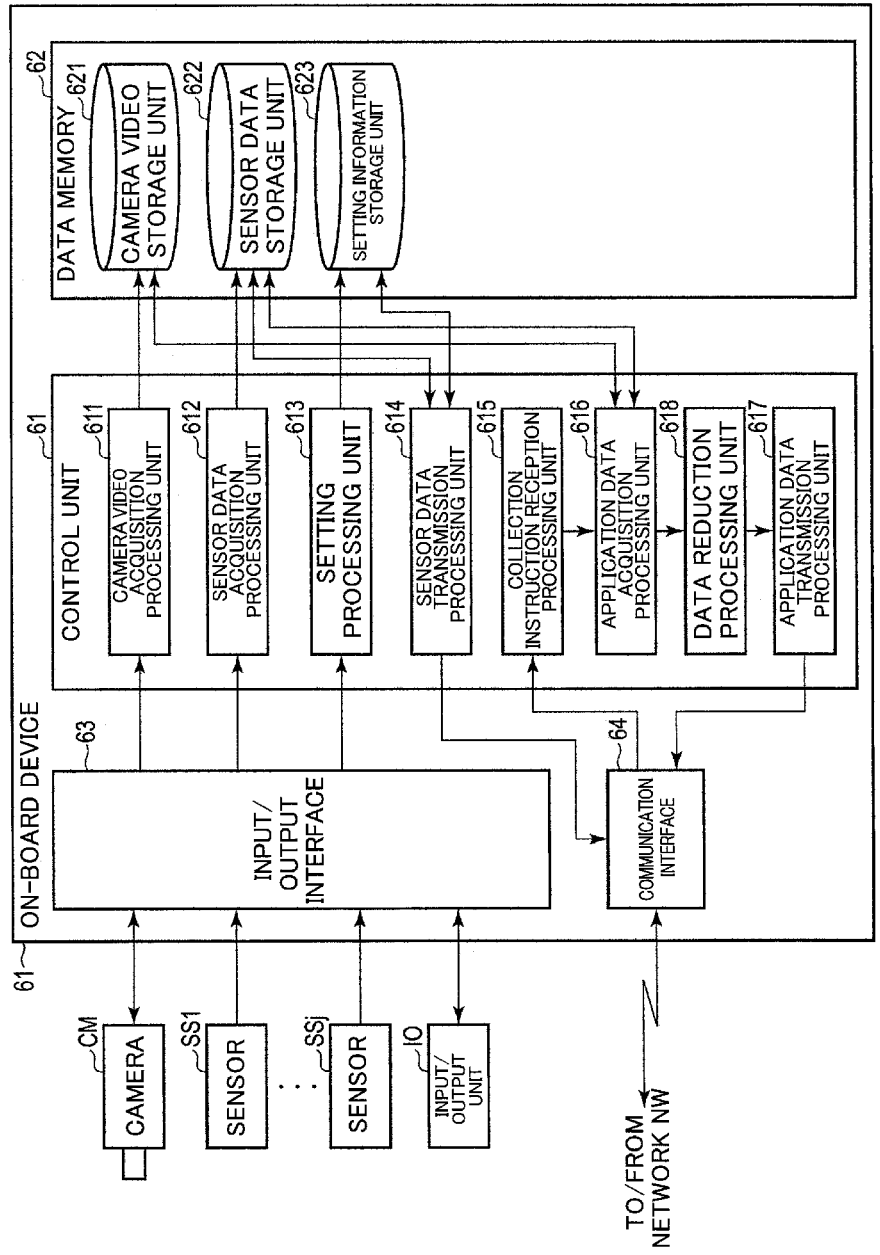
FIG. 30 is a block diagram illustrating an example of a software configuration of an on-board device of an image data collection system according to a fourth embodiment of the present invention.

FIG. 30 is a block diagram illustrating an example of the software configuration of the on-board device 60 of the image data collection system according to the fourth embodiment of the present invention.

As compared with the software configuration of the on-board device 60 of the image data collection system according to the first embodiment illustrated in FIG. 5, the control unit 61 of the on-board device 60 of the image data collection system according to the fourth embodiment has a data reduction processing unit 618.

The data reduction processing unit 618 transmits image data (that is, of which the partial range is removed) which has been trimmed after being acquired by the application data acquisition processing unit 616 to the application data transmission processing unit 617 as application data according to a data collection instruction in which the trimming range determined by the data reduction determination unit 113C is reflected.

Figure 31:
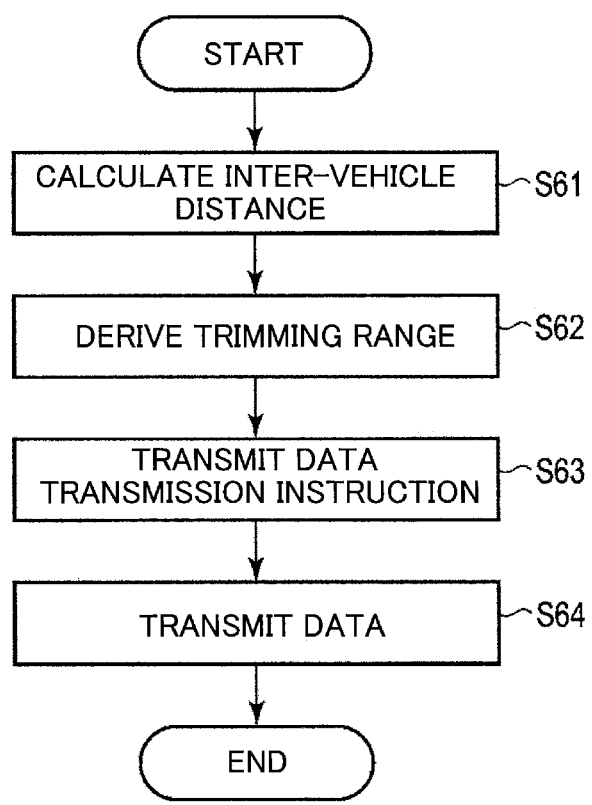
FIG. 31 is a flowchart illustrating an example of a processing operation when the image data collection system according to the fourth embodiment of the present invention is applied to the creation of a static map.

FIG. 31 is a flowchart illustrating an example of a processing operation when the image data collection system according to the fourth embodiment of the present invention is applied to the creation of a static map. Here, it is assumed that the inter-vehicle distance is the inter-vehicle distance between the data collection target vehicle and the front vehicle.

The data reduction determination unit 113C of the data collection condition determination unit 113 of the server 1 calculates the inter-vehicle distance between the data collection target vehicle and the front vehicle using the position information of each vehicle constantly stored in the sensor data storage unit 121 (S61).

Specifically, the data reduction determination unit 113C selects vehicles located within a designated range from the data collection target vehicle, for example, within a radius of 20 meters using the above-mentioned position information. Among the vehicles, particularly, among the vehicles in front, the vehicle closest to the vehicle in the traveling direction of the data collection target vehicle is defined as the vehicle in front.

The data reduction determination unit 113C estimates the inter-vehicle distance of these vehicles on the basis of the position information of the vehicle in front and the position information of the data collection target vehicle. Further, when the data collection target vehicle is equipped with a sensor for measuring the inter-vehicle distance from the vehicle in front, the collection target data may be acquired by the server 1.

It is assumed that the data memory 12 of the server 1 stores in advance the angle of view of the camera CM mounted on each vehicle, the model name thereof, and the trimming range of image data corresponding to the inter-vehicle distance.

The data reduction determination unit 113C derives the trimming range of the image data obtained by this camera CM on the basis of (1) the stored information, (2) the inter-vehicle distance calculated in S61, and (3) the angle of view and the model name of the camera CM mounted on the data collection target vehicle (S62). Moreover, the trimming range may be derived by obtaining the coordinate position where the vehicle in front is photographed on the image using the inter-vehicle distance calculated in S61 on the basis of known methods such as "Toyota Central R&D Labs., Measurement of position of preceding vehicle using video images, https://www.tytlabs.com/japanese/review/rev323pdf/323_0111t ange.pdf, 2015", or "Haku Ri, Zhang Xiaolin, Makoto Sato, Inter-vehicle distance Pitch angle estimation using an in-vehicle monocular camera for distance measurement, https://www.jstage.jst.go.jp/article/itej/69/4/69_J169/_art icle/-char/ja/, 2015".

The collection instruction transmission processing unit 114 transmits a data collection instruction including the trimming range derived by the data reduction determination unit 113C in S62 and the time when the position information used for this derivation is obtained to the on-board device 60 of the data collection target vehicle via the communication interface 14 (S63).

The collection instruction reception processing unit 615 of the on-board device 60 mounted on the data collection target vehicle receives the data collection instruction via the communication interface 64. The application data acquisition processing unit 616 acquires image data corresponding to the time indicated by the data collection instruction from the camera video storage unit 621.

The data reduction processing unit 618 trims the acquired image data according to the trimming range specified in the data collection instruction. The application data transmission processing unit 617 transmits the trimmed image data as application data to the server 1 via the communication interface 64 (S64).

The processes from S61 to S64 are repeated at a specified time interval, for example, once per second.

The above-described process performed by the data reduction determination unit 113C of the control unit 11 of the server 1 may be executed in the control unit 61 of the on-board device 60 mounted on the data collection target vehicle. At this time, the data collection target vehicle is equipped with a sensor capable of measuring the distance to the vehicle in front, and the inter-vehicle distance obtained by this sensor is used in S62 or the like. Then, in a state where the trimming range corresponding to the inter-vehicle distance is stored in the data memory 62 of the on-board device 60, the trimming range is derived by comparing the stored trimming range with the obtained inter-vehicle distance.

The software configuration of each embodiment described above may be incorporated into one system, and the processes, performed by the control unit 11 or the like may be switched and executed as necessary. Further, in consideration of the delay state of communication between the server 1 and the on-board device 60, for example, the data collection target vehicles may be selected in ascending order of delay.

Further, the methods described in each embodiment may be stored in a recording medium such as, for example, magnetic disks (floppy (registered trademark) disks, hard disks, or the like), optical disks (CD-ROM, DVD, MO, or the like), or semiconductor memories (ROM, RAM, flash memory, or the like) as programs (software means) that can be executed by a computer and may be transmitted and distributed by a communication medium. The programs stored on the medium also includes a setting program for configuring the software means (including not only the execution program but also tables and data structures) to be executed by the computer in the computer. A computer that realizes this device reads a program recorded on a recording medium, constructs software means by a setting program in some cases, and executes the above-mentioned processing by controlling the operation by the software means. The recording medium referred to in the present specification is not limited to a distribution medium, and includes storage media such as magnetic disks and semiconductor memories provided in the computer or devices connected via a network.

The invention of the present application is not limited to the above-described embodiments, and can be modified in various forms at the implementation stage without departing from the gist thereof. In addition, the embodiments may be carried out in combination as appropriate as possible, and in that case, the combined effect can be obtained. Further, the above-described embodiment includes inventions at various stages, and various inventions can be extracted by an appropriate combination in a plurality of disclosed configurational requirements.

REFERENCE SIGNS LIST

1 Server
2 Input device
3 Output device
6 Mobile body
11, 61 Control unit
11A, 61A Hardware processor
11B, 61B Program memory
12, 62 Data memory
13, 63 Input/output interface
14, 64 Communication interface
20, 70 Bus
60 On-board device
111, 613 Setting processing unit
112 Sensor data reception processing unit
113 Data collection condition determination unit
113A Mobile body photographing range calculation unit
113B Mobile body selection unit
113C Data reduction determination unit
114 Collection instruction transmission processing unit
115 Application data reception processing unit
121, 622 Sensor data storage unit
122 Application data storage unit
123, 623 Setting information storage unit
611 Camera video acquisition processing unit
612 Sensor data acquisition processing unit
614 Sensor data transmission processing unit
615 Collection instruction reception processing unit
616 Application data acquisition processing unit
617 Application data transmission processing unit
618 Data reduction processing unit
621 Camera video storage unit

The invention claimed is:

1. An image data collecting apparatus comprising:
an acquisition unit that acquires position information of a plurality of mobile bodies on which a photographing device is mounted, and
a selecting unit that acquires, for each mobile body, the position information acquired for the plurality of mobile bodies, information indicating photographing ranges of the photographing devices mounted on the plurality of mobile bodies, and position information of a predetermined object, and selects one mobile body on which a photographing device that outputs collection target image data is mounted from the plurality of mobile bodies on the basis of (a) the position information of the mobile bodies, (b) the information indicating photographing ranges of the photographic devices mounted on the plurality of mobile bodies, and (c) the position information of the predetermined object;
a transmitting unit that transmits a collection instruction for image data which is a photographing result of the photographing device mounted on the mobile body to the selected mobile body; and
a receiving unit that receives the image data transmitted from the mobile body having received the collection instruction.

2. The image data collecting apparatus according to claim 1, wherein
the selecting unit acquires, for each mobile body, the acquired position information, the photographing ranges of the photographing devices mounted on the plurality of mobile bodies, and position information of an obstacle related to movement of the mobile body, and selects a mobile body on which a photographing device that outputs image data as a photographing result in which the obstacle is present in the photographing range is mounted from the plurality of mobile bodies on the basis of the acquired information.

3. The image data collecting apparatus according to claim 1, wherein
the selecting unit acquires, for each mobile body, the position information acquired for one mobile body, the photographing range of the photographing device mounted on the mobile body, and the position information of an obstruction related to the mobile body, and selects a mobile body on which a photographing device that outputs image data as a photographing result in which the obstruction is not present in the photographing range or a photographing result in which the number of obstructions in the photographing range or an occupancy range thereof satisfies a predetermined condition and is small is mounted from the plurality of mobile bodies on the basis of the acquired information.

4. The image data collecting apparatus according to claim 2, further comprising:
a predicting unit that predicts the position information of the obstacle at a timing after than the present time, wherein
the selecting unit selects a mobile body on which a photographing device that outputs image data as a photographing result in which the obstacle is present in the photographing range is mounted from the plurality of mobile bodies on the basis of the acquired position information, the photographing ranges of the photographing devices mounted on the plurality of mobile bodies, and the predicted position information of the obstacle.

5. The image data collecting apparatus according to claim 1, wherein when a photographing range related to image data that has not been received from the plurality of mobile bodies overlaps a photographing range related to image data that has been received by the receiving unit, the selecting unit selects a mobile body on which a photographing device that outputs image data as a photographing result in a photographing range that has a little overlap with the photographing range related to the received image data is mounted from the plurality of mobile bodies.

6. An image data collecting apparatus comprising:

an acquisition unit that acquires position information of a plurality of mobile bodies on which a photographing device is mounted;

a first calculation unit that calculates a distance between one mobile body on which a photographing device that outputs collection target image data is mounted among the plurality of mobile bodies and which is selected from the plurality of mobile bodies on the basis of (a) the position information of the mobile bodies, (b) information indicating photographing ranges of the photographic devices mounted on the plurality of mobile bodies, and (c) position information of a predetermined object, and another mobile body on the basis of the acquired position information;

a second calculation unit that calculates an unnecessary range of a photographing result obtained by a photographing device mounted on the selected mobile body on the basis of the calculated distance; and a collection unit that collects image data from which the calculated unnecessary range has been removed.

7. An image data collection method executed by an image data collecting apparatus, comprising:

acquiring position information of a plurality of mobile bodies on which a photographing device is mounted, and acquiring, for each mobile body, the position information acquired for the plurality of mobile bodies, information indicating photographing ranges of the photographing devices mounted on the plurality of mobile bodies, and position information of a predetermined object, and selecting one mobile body on which a photographing device that outputs collection target image data is mounted from the plurality of mobile bodies on the basis of the acquired information; (a) the position information of the mobile bodies, (b) the information indicating photographing ranges of the photographic devices mounted on the plurality of mobile bodies, and (c) the position information of the predetermined object;

transmitting a collection instruction for image data which is a photographing result of the photographing device mounted on the mobile body to the selected mobile body; and receiving the image data transmitted from the mobile body having received the collection instruction.

8. A non-transitory computer readable storage medium storing an image data collection program for operating a hardware processor as each of the units provided in the image data collecting apparatus according to claim 1.

9. An image data transmission apparatus mounted on [a] one mobile body on which a photographing device that outputs collection target image data is mounted and which is selected by an image data collecting apparatus from a plurality of mobile bodies on the basis of (a) position information of the mobile bodies, (b) information indicating photographing ranges of a photographic devices mounted on the plurality of mobile bodies, and (c) position information of a predetermined object, and configured to:

receive a collection instruction for image data which is a photographing result of the photographing device mounted on the selected mobile body from the image data collecting apparatus; and select collection target image data when the position of the obstacle is changed among the image data which is a photographing result in which the obstacle is present in the photographing range of the photographing device, according to the data collection instruction, and transmit the selected image data to the image data collecting apparatus.

10. An image data transmission apparatus mounted on one mobile body on which a photographing device that outputs collection target image data is mounted and which is selected by an image data collecting apparatus from a plurality of mobile bodies on the basis of (a) position information of the mobile bodies, (b) information indicating photographing ranges of a photographic devices mounted on the plurality of mobile bodies, and (c) position information of a predetermined object, and configured to:

receive a collection instruction for image data which is a photographing result of the photographing device mounted on the selected mobile body from the image data collecting apparatus; and transmit collection target image data which is applied a removal process according to the range specified in the collection instruction within the photographing range of the photographing device, according to the data collection instruction, to the image data collecting apparatus.

* * * * *